(12) United States Patent
Adachi et al.

(10) Patent No.: US 11,665,649 B2
(45) Date of Patent: *May 30, 2023

(54) WIRELESS COMMUNICATION APPARATUS

(71) Applicant: INTERNATIONAL SEMICONDUCTOR GROUP, Seoul (KR)

(72) Inventors: Tomoko Adachi, Kawasaki (JP); Koichiro Ban, Kawasaki (JP); Tomoya Tandai, Kawasaki (JP); Hideo Kasami, Yokohama (JP)

(73) Assignee: INTERNATIONAL SEMICONDUCTOR GROUP, Seoul (KR)

( * ) Notice: Subject to any disclaimer, the term of this patent is extended or adjusted under 35 U.S.C. 154(b) by 71 days.

This patent is subject to a terminal disclaimer.

(21) Appl. No.: 17/320,861

(22) Filed: May 14, 2021

(65) Prior Publication Data

US 2021/0274447 A1 Sep. 2, 2021

Related U.S. Application Data

(60) Continuation of application No. 16/745,224, filed on Jan. 16, 2020, now Pat. No. 11,012,951, which is a
(Continued)

(30) Foreign Application Priority Data

Jan. 31, 2011 (JP) ................................. 2011-019059

(51) Int. Cl.
*H04W 74/08* (2009.01)
*H04W 52/34* (2009.01)
(Continued)

(52) U.S. Cl.
CPC ........... *H04W 52/34* (2013.01); *H04W 16/14* (2013.01); *H04W 52/54* (2013.01); *H04W 72/51* (2023.01);
(Continued)

(58) Field of Classification Search
CPC ... H04W 52/34; H04W 72/048; H04W 52/54; H04W 74/0808; H04W 16/14; H04W 72/082; H04W 84/12; H04W 88/06
See application file for complete search history.

(56) References Cited

U.S. PATENT DOCUMENTS 6,067,291 A 5/2000 Kamerman et al.
6,970,682 B2 11/2005 Crilly et al.
(Continued)

FOREIGN PATENT DOCUMENTS

CN 1585294 A 2/2005
CN 1708912 A 12/2005
(Continued)

OTHER PUBLICATIONS

Chinese Office Action dated Jul. 4, 2017 issued in counterpart Chinese Application No. 201510081861.1.
(Continued)

*Primary Examiner* — Lan-Huong Truong
(74) *Attorney, Agent, or Firm* — Holtz, Holtz & Volek PC

(57) ABSTRACT

A wireless communication apparatus supports a first scheme and a second scheme. A communication range for the second scheme is narrower than a communication range for the first scheme. Processing circuitry of the apparatus is configured to set first information and second information. If the second scheme is used, the processing circuitry sets a second level greater than a first level for the second information and sets a second power value smaller than a first power value for the first information. The first level and the first power value are
(Continued)

used for the first scheme. The second power value is decided based on a receiving sensitivity required for a physical scheme selected by the second scheme.

20 Claims, 3 Drawing Sheets

Related U.S. Application Data continuation of application No. 15/938,187, filed on Mar. 28, 2018, now Pat. No. 10,575,262, which is a continuation of application No. 14/993,680, filed on Jan. 12, 2016, now Pat. No. 9,955,439, which is a continuation of application No. 14/537,552, filed on Nov. 10, 2014, now Pat. No. 9,271,308, which is a division of application No. 13/223,587, filed on Sep. 1, 2011, now Pat. No. 8,897,282.

(51) Int. Cl.
*H04W 16/14* (2009.01)
*H04W 72/51* (2023.01)
*H04W 72/541* (2023.01)
*H04W 52/54* (2009.01)
*H04W 88/06* (2009.01)
*H04W 84/12* (2009.01)

(52) U.S. Cl.
CPC ..... *H04W 72/541* (2023.01); *H04W 74/0808* (2013.01); *H04W 84/12* (2013.01); *H04W 88/06* (2013.01)

(56) References Cited

U.S. PATENT DOCUMENTS

| | | | |
|---|---|---|---|
| 7,657,276 B2 | 2/2010 | Sakoda | |
| 8,369,794 B1* | 2/2013 | Bharghavan | H04L 12/413 |
| | | | 370/252 |
| 9,106,330 B2 | 8/2015 | Matsuo et al. | |
| 9,258,828 B2 | 2/2016 | Adachi et al. | |
| 9,613,474 B2 | 4/2017 | Adachi et al. | |
| 10,362,017 B2 | 7/2019 | Adachi et al. | |
| 10,420,141 B2 | 9/2019 | Adachi et al. | |
| 10,771,446 B2 | 9/2020 | Adachi et al. | |
| 2003/0064752 A1 | 4/2003 | Adachi et al. | |
| 2004/0110477 A1 | 6/2004 | Nishimura et al. | |
| 2005/0043054 A1* | 2/2005 | Asada | H04W 52/40 |
| | | | 455/69 |
| 2006/0154628 A1 | 7/2006 | Mochizuki | |
| 2006/0209746 A1* | 9/2006 | Asai | H04W 16/14 |
| | | | 370/465 |
| 2007/0047570 A1 | 3/2007 | Benveniste et al. | |
| 2007/0149237 A1 | 6/2007 | Russell et al. | |
| 2007/0206695 A1 | 9/2007 | Ye et al. | |
| 2007/0242621 A1 | 10/2007 | Nandagopalan et al. | |
| 2009/0109885 A1 | 4/2009 | Fonseca et al. | |
| 2009/0318182 A1 | 12/2009 | Nagato et al. | |
| 2010/0290355 A1 | 11/2010 | Roy et al. | |
| 2010/0329137 A1 | 12/2010 | Yamada et al. | |
| 2012/0320759 A1 | 12/2012 | Shao et al. | |
| 2019/0357257 A1 | 11/2019 | Adachi et al. | |
| 2020/0334932 A1 | 10/2020 | Adachi et al. | |
| 2020/0334933 A1 | 10/2020 | Adachi et al. | |
| 2020/0334934 A1 | 10/2020 | Adachi et al. | |

FOREIGN PATENT DOCUMENTS

| | | |
|---|---|---|
| JP | 11163897 A | 6/1999 |
| JP | 2005253047 A | 9/2005 |
| JP | 2008235978 A | 10/2008 |
| JP | 2010004187 A | 1/2010 |
| JP | 2010093564 A | 4/2010 |
| JP | 2011009975 A | 1/2011 |
| JP | 5422766 B2 | 2/2014 |
| WO | 2006076697 A2 | 7/2006 |

OTHER PUBLICATIONS

IEEE; "Local and Metropolitan Area Networks—Specific Requirements"; 2007; pp. 256-271.
Japanese Office Action (and English translation thereof) dated Apr. 5, 2016 issued in counterpart Japanese Application No. 2015-043793.
Japanese Office Action dated Dec. 18, 2012, in counterpart Japanese Application No. 2011-019059.
Japanese Office Action dated Jun. 24, 2014 in counterpart Japanese Application No. 2013-241787.
English translation of the Japanese Office Action dated Apr. 5, 2016 issued in counterpart Japanese Application No. 2015-043793.

* cited by examiner

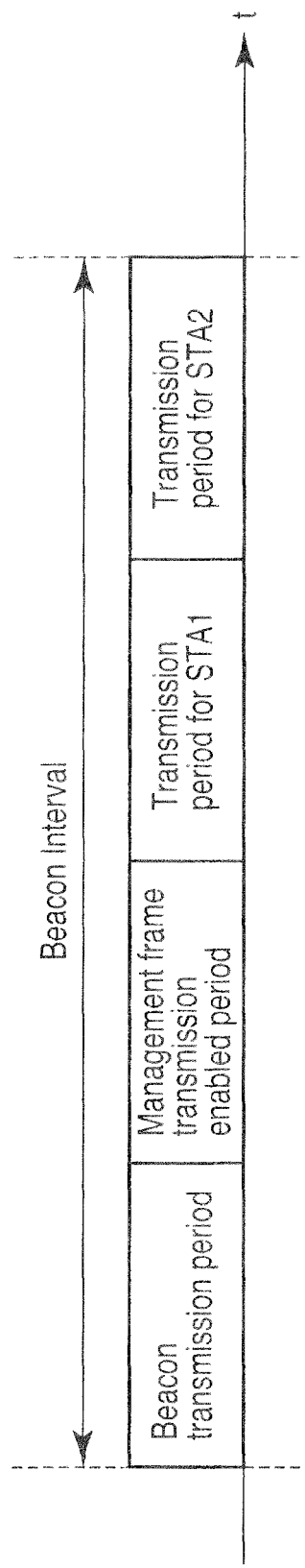

FIG. 5

| Parameter | Description |
|---|---|
| BSS Type | Specifies type of target BSS under scan |
| BSSID | Specifies target BSSID or indicates BSSID unspecified under scan |
| SSID | Specifies target SSID or indicates SSID unspecified under scan |
| Scan Type | Indicates active scan or passive scan |
| Probe Delay | Indicates time required before probe request is transmitted in case of active scan |
| Channel List | Specifies a list of target channels under scan |
| Min Channel Time | Indicates minimum scan time for each channel |
| Max Channel Time | Indicates maximum scan time for each channel |
| Vendor Specific Info | Indicates vendor specific conditions |

FIG. 6

WIRELESS COMMUNICATION APPARATUS

CROSS-REFERENCE TO RELATED APPLICATIONS

This is a Continuation of U.S. application Ser. No. 16/745,224, filed Jan. 16, 2020, which is a Continuation of U.S. application Ser. No. 15/938,187, filed Mar. 28, 2018, which is a Continuation of U.S. application Ser. No. 14/993,680 (now U.S. Pat. No. 9,955,439), filed Jan. 12, 2016, which is a Continuation of U.S. application Ser. No. 14/537,552 (now U.S. Pat. No. 9,271,308), filed Nov. 10, 2014, which is a Divisional of U.S. application Ser. No. 13/223,587 (now U.S. Pat. No. 8,897,282), filed Sep. 1, 2011, which is based upon and claims the benefit of priority from prior Japanese Patent Application No. 2011-019059, filed Jan. 31, 2011, the entire contents of all of which are incorporated herein by reference.

FIELD

Embodiments described herein relate generally to wireless communication.

BACKGROUND

As a wireless communication scheme based on carrier sense, for example, IEEE 802.11 is known. In IEEE 802.11, a carrier sense level is uniquely determined for each physical scheme. Thus, according to IEEE 802.11, a plurality of wireless communication apparatuses using the same physical scheme can share the same wireless medium for coexistence.

However, problems may occur if the wireless communication apparatus (referred to as a first wireless communication apparatus in BACKGROUND for convenience) controls the maximum transmission power based on a wireless communication scheme (which is based on carrier sense), for example, IEEE 802.11, to implement close proximity wireless communication with a communication range limited to the order of, for example, several centimeters. Specifically, the equal coexistence between the first wireless communication apparatus and another wireless communication apparatus using the normal maximum transmission power (in BACKGROUND, this wireless communication apparatus is referred to as a second wireless communication apparatus for convenience) is difficult if the second wireless communication apparatus uses the same wireless medium as that for the first wireless communication apparatus and if the first wireless communication apparatus is present within the communication range of the second wireless communication apparatus. The following situation may occur, for example: signals transmitted by the first wireless communication apparatus fail to reach the carrier sense level of the second wireless communication apparatus; however, signals transmitted by the second wireless communication apparatus reach the carrier sense level of the second wireless communication apparatus. Hence, the second wireless communication apparatus can transmit signals regardless of the status of transmissions from the first wireless communication apparatus. However, the first wireless communication apparatus is prevented from transmitting signals depending on the status of transmissions from the second wireless communication apparatus. That is, the first wireless communication apparatus is in an inferior position compared to the second wireless communication apparatus.

Furthermore, the conventional wireless communication scheme based on carrier sense assumes that a plurality of wireless communication apparatuses communicate with one another. Moreover, the wireless communication scheme is designed based on the policy that even if a communication link is degraded, an attempt is made to maintain the communication link. On the other hand, in the close proximity communication, the communication among a plurality of wireless communication apparatuses is not always necessary, and point-to-point communication often has to be only implemented. Moreover, requirement specifications for the close proximity communication include a reduction in the time required until data exchange is started and distinct disconnection of a communication link when a communication distance becomes longer than a certain level.

BRIEF DESCRIPTION OF THE DRAWINGS

FIG. 5 is a diagram illustrating a schedule for a Beacon Interval; and

FIG. 6 is a table illustrating parameters provided in an MLME-SCAN.request primitive based on IEEE 802.11.

DETAILED DESCRIPTION

Figure 1:
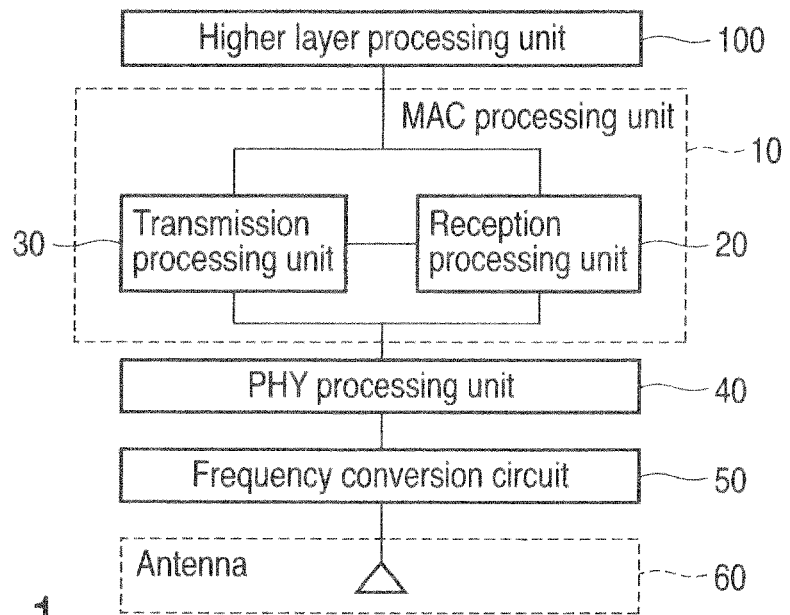
FIG. 1 is a block diagram illustrating a wireless communication apparatus according to a first embodiment.

Embodiments will be described below with reference to the drawings. In the embodiments, elements that are the same or similar to described elements are denoted by the same or similar reference numerals. Duplicate descriptions are basically omitted.

According to embodiments, a wireless communication apparatus supports at least a second wireless communication scheme between a first wireless communication scheme and the second wireless communication scheme. The first wireless communication scheme requires that a wireless medium is determined to be busy when a reception level is equal to or greater than a minimum reception sensitivity level of a physical scheme. The apparatus includes a first processing unit, a second processing unit and a third processing unit. The first processing unit is configured to set a value lower than a maximum transmission power of the first wireless communication scheme, for a maximum transmission power of the second wireless communication scheme and set a value greater than the minimum reception sensitivity level of the physical scheme, for a carrier sense level, when the second wireless communication scheme is used. The second processing unit is configured to carry out carrier sense using the carrier sense level. The third processing unit is configured to control transmission and reception of a signal via the second processing unit.

The embodiments will be described below assuming an IEEE 802.11 wireless LAN as an example of the wireless communication scheme based on carrier sense. Of course, the embodiments can be applied to other wireless communication schemes.

IEEE 802.11 deals with a plurality of frequency bands. In IEEE 802.11, a physical layer (PHYsical; PHY) specification is provided for each of the plurality of frequency bands.

A medium access control (MAC) layer specification is provided as a higher layer specification to the PHY specification.

For example, 802.11a specifies a 5-GHz band, 802.11g specifies a 2.4-GHz band, and 802.11n specifies the 2.4-GHz band and the 5-GHz band. Moreover, 802.11ad, which is under the standardization process, is to specify a 60-GHz band (millimeter-wave band).

These PHY specifications include specifications for carrier sense levels. Upon receiving power that is equal to or greater than a specified carrier sense level, a wireless communication apparatus is required to determine that a medium (Clear Channel Assessment; CCA) is busy. More specifically, upon receiving a supported PHY signal which the wireless communication apparatus supports, the wireless communication apparatus is required to determine that the medium (CCA) is busy provided that the reception level (Receive Signal Strength Indicator; RSSI) of the signal is equal to or greater than the minimum receiving sensitivity according to the PHY scheme. Otherwise (for example, if the wireless communication apparatus receives a signal not known to be based on the supported PHY scheme, a signal based on a PHY scheme different from the supported one, or simply noise), the wireless communication apparatus is required to determine that the medium (CCA) is busy provided that the reception level is equal to or greater than the above-described minimum reception sensitivity plus a fixed value. According to the IEEE 802.11 wireless LAN, the fixed value is basically specified to be 20 dB. Adjustment of the carrier sense level will be described below, and in the description, the carrier sense level refers to the carrier sense level used when a signal based on the supported PHY scheme is received (that is, the carrier sense level to which the fixed value is not added).

Now, a technique to detect the PHY scheme will be described. A PHY scheme used to transmit a PHY packet is described in a PHY header of the PHY packet. Thus, if the reception signal is a PHY packet, the wireless communication apparatus can refer to the PHY header to determine whether or not the received signal is based on the supported PHY scheme.

First Embodiment

As shown in FIG. 1, a wireless communication apparatus according to a first embodiment includes a higher layer processing unit 100, a MAC processing unit 10, a PHY processing unit 40, a frequency conversion circuit 50, and an antenna 60.

The higher layer processing unit 100 carries out processing for the higher layer above the MAC layer. The high layer processing unit can exchange signals with the MAC processing unit 10.

The MAC processing unit 10 carries out processing for the MAC layer. As described above, the MAC processing unit 10 can exchange signals with the higher layer processing unit 100. The MAC processing unit 10 can further exchange signals with the PHY processing unit 40. The MAC processing unit 10 includes a reception processing unit 20 and a transmission processing unit 30.

The PHY processing unit 40 carries out processing for the PHY layer. As described above, the PHY processing unit 40 can exchange signals with the MAC processing unit 10. The PHY processing unit 40 is connected to the antenna 60 via the frequency conversion circuit 50. The frequency conversion circuit 50 carries out up-conversion/down-conversion to exchange signals.

In FIG. 1 or other drawings, the single antenna 60 is shown, but of course, a plurality of antennas 60 may be provided. Furthermore, a plurality of different PHY processing units 40 may be provided, and reception processing units 20 and transmission processing units 30 corresponding to the respective PHY processing units 40 may be provided. Moreover, a common processing unit covering the plurality of PHY processing units 40 may be provided.

Furthermore, the wireless communication apparatus according to the present embodiment includes the antenna 60 as a component as shown in FIG. 1 (the wireless communication apparatus is integrated with the antenna 60). Thus, the implementation area of the antenna 60 can be reduced. Moreover, in the wireless communication apparatus according to the present embodiment, the reception processing unit 20 and the transmission processing unit 30 share the antenna 60 as shown in FIG. 1. The antenna shared by the reception processing unit 20 and the transmission processing unit 30 allows compact implementation of the wireless communication apparatus in FIG. 1. Of course, the wireless communication apparatus according to the present embodiment may be configured differently from the one illustrated in FIG. 1.

When transmitting a signal, the PHY processing unit 40 receives a MAC frame from the transmission processing unit 30. The PHY processing unit 40 carries out processing such as encoding on the MAC frame to convert the MAC frame into a PHY packet. The frequency conversion circuit 50 converts the PHY packet into a wireless signal on a required frequency band (for example, 60-GHz millimeter-wave band). The antenna 60 radiates the wireless signal resulting from the frequency conversion. During the signal transmission, the PHY processing unit 40 outputs a signal indicating that the medium is busy, to the MAC processing unit 10 (more precisely, to the reception processing unit 20).

When receiving a signal, the frequency conversion circuit 50 converts a wireless signal received by the antenna 60 into a signal on a required frequency band (a baseband that can be processed by the PHY processing unit 40). The PHY processing unit 40 receives the reception signal on the baseband to detect the reception level of the signal, while determining the PHY scheme of the signal. The PHY processing unit 40 selects a carrier sense level in accordance with the PHY scheme. The PHY processing unit 40 compares the selected carrier sense level with the reception level. If the reception level is equal to or greater than the selected carrier sense level, the PHY processing unit 40 outputs a signal indicating that the medium (CCA) is busy, to the MAC processing unit 10 (more precisely, the reception processing unit 20). Otherwise, the PHY processing unit 40 outputs a signal indicating that the medium (CCA) is idle, to the MAC processing unit 10 (more precisely, the reception processing unit 20). If the received signal is based on the appropriate PHY scheme (that is, the PHY scheme which the wireless communication apparatus supports), the PHY processing unit 40 carries out a decoding process, a process of removing a preamble and a PHY header, and the like to extract a payload. The PHY processing unit 40 passes the payload to the reception processing unit 20 as a MAC frame. Moreover, before passing the MAC frame to the reception processing unit 20, the PHY processing unit 40 notifies the reception processing unit 20 that reception of a PHY packet is to start. After passing the MAC frame to the reception processing unit 20, the PHY processing unit 40 notifies the reception processing unit 20 that the reception of the PHY packet has ended. Furthermore, if the received PHY packet is normal (no error is detected), the PHY processing unit 40 notifies the reception processing unit 20 that the reception of the PHY packet has ended, and passes a signal indicating that the medium is idle, to the reception processing unit 20. When detecting an error in the received packet, the PHY processing unit 40 notifies the reception processing unit 20 that the error has been detected.

The MAC processing unit 10 deals with three types of MAC frames; a data frame, a control frame, and a management frame, and carries out various types of processing specified for the MAC layer. Now, the three types of MAC frames will be described.

The management frame is used to manage communication links with other wireless communication apparatuses. For example, the management frame includes a beacon frame used to report group attribute and synchronization information required to form a wireless communication group that is a basic service set (BSS) based on IEEE 802.11, and frames exchanged with other wireless communication apparatuses for authentication or establishment of communication links.

The data frame is used to transmit data to another wireless communication apparatus with a communication link with this wireless communication apparatus established. For example, a user manipulates a relevant application to generate data in the wireless communication apparatus in FIG. 1. The data is carried by the data frame. Specifically, the generated data is passed from the higher layer processing unit 100 to the transmission processing unit 30. During transmission, the data is carried in a frame body field of the data frame as a payload. Furthermore, upon receiving the data frame, the reception processing unit 20 extracts and processes information in the frame data field as data. The reception processing unit 20 then passes the processed information to the higher layer processing unit 100. This allows the application to perform an operation such as data write or reproduction.

The control frame is used for control during transmission and reception (exchange) of the management and data frames with another wireless communication apparatus. The control frame includes an RTS (Request To Send) frame and a CTS (Clear To Send) frame which are exchanged with another wireless communication apparatus in order to reserve the medium before starting to exchange the management and data frames. Furthermore, the control frame includes an ACK (Acknowledgement) frame and a BA (Block Ack) frame which are transmitted for confirmation of delivery of the received management and data frames.

The MAC processing unit 10 needs to acquire an access right (transmission right) on the medium before transmitting the MAC frame. The transmission processing unit 30 adjusts a transmission timing based on carrier sense information (described below) from the reception processing unit 20. The transmission processing unit 30 gives a transmission instruction to and passes the MAC frame to the PHY processing unit 40 in accordance with the transmission timing. In addition to giving the transmission instruction, the transmission processing unit 30 may indicate to the PHY processing unit 40 a modulation scheme and a coding scheme used for the transmission. Further, the transmission processing unit 30 may indicate transmission power to the PHY processing unit 40. Once acquiring the access right, the MAC processing unit 10 can consecutively exchange MAC frames with another wireless communication apparatus, while a media occupation time, QoS (Quality of Service) attributes and the like limited. For example, the access right is acquired when the wireless communication apparatus transmits a predetermined frame and correctly receives a response frame from another wireless communication apparatus. When the predetermined frame is received by another wireless communication apparatus, this wireless communication apparatus transmits the response frame after a minimum frame interval time (Short Interval Frame Space) elapses, for example.

The reception processing unit 20 manages carrier sense information. The carrier sense information includes both physical carrier sense information relating to the busy/idle state of the medium according to the input by the PHY processing unit 40 and virtual carrier sense information based on a medium reservation time described in the received frame. If one of these pieces of information indicates the busy state, signal transmissions are inhibited during the state. In IEEE 802.11, the medium reservation time is described in what is called a duration/ID field in the MAC header. Upon receiving a MAC frame destined for another wireless communication apparatus (not for the present wireless communication apparatus), the MAC processing unit 10 determines that the medium is virtually busy for the medium reservation time from the end of the PHY packet containing the MAC frame. A mechanism for virtually determining the medium to be busy or the period when the medium is virtually busy is referred to as the NAV (Network Allocation Vector).

As described below, the wireless communication apparatus according to the present embodiment is based on a normal wireless communication scheme using a carrier sense (CCA) in accordance with the minimum reception sensitivity level of the above-described PHY scheme, to realize a close proximity communication scheme that can coexist with the normal wireless communication scheme. The normal wireless communication scheme is hereinafter referred to as a normal scheme for convenience (or may be referred to as a non-close proximity scheme). The close proximity wireless communication scheme that can coexist with the normal wireless communication scheme is referred to as a close proximity scheme.

As described below, the wireless communication apparatus according to the present embodiment may support a scheme for a particular frequency band or may be hybrid and support a scheme for a plurality of frequency bands. Moreover, the wireless communication apparatus according to the present embodiment may support both the close proximity scheme and the normal scheme (for example, wireless LAN). In the description below, the wireless communication apparatus according to the present embodiment is assumed to support at least the close proximity scheme based on the normal wireless LAN scheme. Here, the close proximity scheme is assumed to be such that the communication range is limited to of the order of several centimeters (for example, 3 cm) and that communication is enabled within the communication range.

The wireless communication apparatus controls the maximum transmission power in order to limit the communication range. For example, when the wireless communication apparatus uses a millimeter-wave band, it can be assumed that; a propagation loss is a free space propagation loss+10 dB, and an antenna gain is 0 dB for both transmission and reception. Here, the wireless communication apparatus selects a predetermined modulation and coding scheme (MCS) with the lowest reception sensitivity level in the system to transmit a basic management frame, for example, a beacon. The MCS is referred to as MCS0 and its reception sensitivity level is assumed to be −78 dBm. On the other hand, the wireless communication apparatus selects one of MCS1 to MCS12 involving greater reception sensitivity levels than MCS0 to transmit other frames including the data frame. Among MCS1 to MCS12, MCS1 is assumed to have the minimum reception sensitivity level of −68 dB. Furthermore, MCS0 is assumed to be distinguished from MCS1 to MCS 12 based on a difference in PHY scheme.

For example, it is assumed that if the wireless communication apparatus selects MCS0, the transmission power needs to be −30 dBm in order to set the reception level at a distance of 3 cm from the transmission source to −78 dBm. On the other hand, it is assumed that if the wireless communication apparatus selects MCS4, the transmission power needs to be −16 dBm in order to set the reception level at a distance of 3 cm from the transmission source to −64 dBm (the reception sensitivity level of MCS4, −64 dBm, is greater than the reception sensitivity level of MCS0, −78 dBm, by 14 dB, and the transmission power needs to be increased by 14 dB). When the transmission power is −16 dBm, the distance at which the carrier sense (CCA) indicates the busy state, that is, the distance at which the reception level exceeds the reception sensitivity level of MCS1, −68 dBm, is for example, 5 cm. That is, compared to the case when the wireless communication apparatus uses MCS0, the distance at which the carrier sense (CCA) indicates busy increases. If the minimum transmission rate within a predetermined communication range is required, the wireless communication apparatus may select one of the MCSs which can achieve the transmission rate to be achieved and set the maximum transmission power such that the minimum reception sensitivity is obtained at the edge of the predetermined communication range. Then, the wireless communication apparatus may enable this MCS or any other MCS with a higher transmission rate to be exclusively selected and carry out transmission with transmission power equal to or lower than the set maximum transmission power. That is, the maximum transmission power of the wireless communication apparatus is lower than that for the normal scheme.

The transmission power based on the normal scheme is normally between about 0 dBm and several tens of dBm. That is, the above-described controlled transmission power is lower than that for the normal scheme by about several tens of dBm as exemplified for MCS0 and MCS1 to MCS4.

Furthermore, the scheme in which the communication range is limited by controlling the maximum transmission power is in an inferior position compared to the normal scheme under coexistence. For example, it is assumed that two wireless communication apparatuses are arranged (in the present embodiment, one of the wireless communication apparatuses is referred to as a first wireless communication apparatus and the other is referred to as a second wireless communication apparatus); the second wireless communication apparatus transmits the beacon frame at a transmission power of 10 dBm, and the first wireless communication apparatus transmits the beacon frame with the maximum transmission power limited to −30 dBm. When the second wireless communication apparatus selects MCS0 and transmits the beacon frame at a transmission power of 10 dBm, the reception level at a distance of 3 m from the transmission source is equal to the reception sensitivity level of −78 dBm. Thus, if the distance between the first wireless communication apparatus and the second wireless communication apparatus is equal to or shorter than 3 m, the reception level at the first wireless communication apparatus is equal to or greater than −78 dBm. That is, the first wireless communication apparatus determines that CCA is busy. On the other hand, when the first wireless communication apparatus selects MCS0 and transmits the beacon frame at a transmission power of −30 dBm, the reception level at a distance of 3 cm from the transmission source is equal to the reception sensitivity level of −78 dBm. Hence, if the distance between the second wireless communication apparatus and the first wireless communication apparatus is longer than 3 cm, the reception level at the second wireless communication apparatus is less than −78 dBm. That is, the second wireless communication apparatus determines that CCA is idle. Consequently, while the second wireless communication apparatus is transmitting a signal, the first wireless communication apparatus detects interference and cannot transmit its signal. On the other hand, while the first wireless communication apparatus is transmitting a signal, the second wireless communication apparatus detects no interference and can thus transmit its signal. Therefore, it is more difficult for the first wireless communication apparatus to acquire the transmission right than for the second wireless communication apparatus. In this sense, the first wireless communication apparatus is inferior to the second wireless communication apparatus.

Thus, the wireless communication apparatus according to the present embodiment implements the close proximity scheme described below. The close proximity scheme, for example, limits the maximum transmission power, while using a higher carrier sense level than the normal scheme. That is, when the wireless communication apparatus based on the close proximity scheme is located away from a wireless communication apparatus based on the normal scheme to the extent that the wireless communication apparatus based on the close proximity scheme does not interfere with the wireless communication apparatus based on the normal scheme (when the wireless communication apparatus based on the close proximity scheme transmits a signal, the wireless communication apparatus based on the normal scheme does not determine that the CCA is busy), even upon receiving the signal from the wireless communication apparatus based on the normal scheme, the wireless communication apparatus based on the close proximity scheme does not detect it as interference. Specifically, the PHY processing unit 40 avoids determining that CCA is busy and providing the corresponding notification to the MAC processing unit 10 (more precisely, the reception processing unit 20). The close proximity scheme is assumed to use the same PHY scheme (the same PHY packet format and the same MCS set) as that of the normal scheme. Furthermore, it is assumed that the close proximity scheme is required to achieve the transmission rate for MCS0 at a distance of 3 cm from the transmission source.

Figure 2:
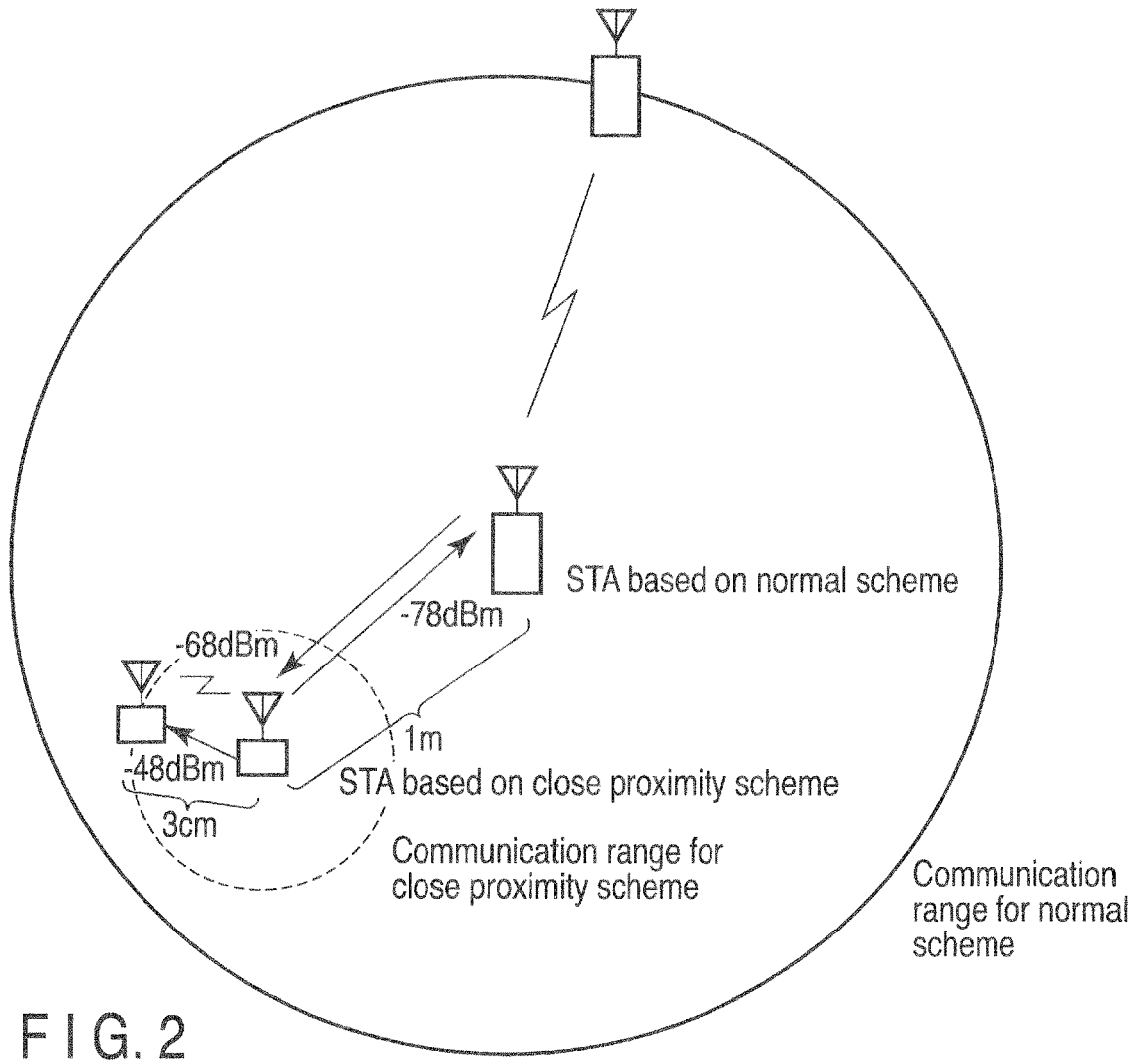
FIG. 2 is a diagram illustrating a carrier sense level used by a wireless communication apparatus based on a close proximity scheme.

Now, the carrier sense level used by the wireless communication apparatus based on the close proximity scheme will be described with reference to FIG. 2. It is assumed that the wireless communication apparatus based on the normal scheme selects MCS0 to transmit signals at a transmission power of 10 dBm, whereas the wireless communication apparatus based on the close proximity scheme selects MCS0 to transmit signals at a transmission power of 0 dBm (that is, the maximum transmission power of the close proximity scheme is limited to 0 dBm). Moreover, it is assumed that the propagation loss is the free space propagation loss+10 dB and that the antenna gain is 0 dB for both transmission and reception. In FIG. 2, the wireless communication apparatuses are denoted as STA (station). When the distance between the wireless communication apparatus based on the normal scheme and the wireless communication apparatus based on the close proximity scheme is 1 m, a signal transmitted by the wireless communication apparatus based on the close proximity scheme using the selected MCS0 is received by the wireless communication apparatus based on the normal scheme at a reception level of −78 dBm. Thus, if the two wireless communication apparatuses are at a distance of longer than 1 m from each other, the wireless communication apparatus based on the normal scheme does not determine that CCA is busy by the signal from the wireless communication apparatus based on the close proximity scheme. Thus the wireless communication apparatus based on the normal scheme can transmit signals.

Now, the carrier sense level used by the wireless communication apparatus based on the close proximity scheme will be discussed; the carrier sense level is adjusted to allow the wireless communication apparatus based on the close proximity scheme and the wireless communication apparatus based on the normal scheme to coexist equally while these wireless communication apparatuses locate at a distance of longer than 1 m from each other. When the distance between the wireless communication apparatuses is 1 m, a signal transmitted by the wireless communication apparatus based on the normal scheme by selectively using MCS0 is received by the wireless communication apparatus based on the close proximity scheme at a reception level of −68 dBm. The reception level of −68 dBm is greater than the reception level required for MCS0, that is, −78 dBm. As is apparent from the above-described example, for a signal transmitted at a transmission power of 10 dBm by selectively using MCS0, the reception sensitivity level of −78 dBm is only achieved at a distance of 3 m from the transmission source. Hence, even if the wireless communication apparatus based on the close proximity scheme is located at a distance of slightly longer than 1 m from the wireless communication apparatus based on the normal scheme, the wireless communication apparatus based on the close proximity scheme determines that CCA is busy based on the signal from the wireless communication apparatus based on the normal scheme because the reception level in this case is greater than −78 dBm.

Thus, the wireless communication apparatus according to the present embodiment sets the carrier sense level to, for example, greater than −68 dBm so as to avoid determining that CCA is busy even in the above-described circumstances. It is assumed that the maximum communication range for the close proximity scheme is 3 cm and that for a signal transmitted at a transmission power of 0 dBm by selectively using MCS0, the reception level is −48 dBm at a distance of 3 cm from the transmission source. Under these conditions, the wireless communication apparatus according to the present embodiment sets the carrier sense level for MCS0 to −48 dBm. That is, the PHY processing unit 40 determines that CCA is busy when the reception level is equal to or greater than −48 dBm and the PHY processing unit 40 notifies the MAC processing unit 10 that CCA is busy. Then, the PHY processing unit 40 extracts a payload from a PHY packet successively received when the reception level is equal to or greater than −48 dBm. The PHY processing unit 40 then passes the payload to the MAC processing unit 10 as a MAC frame.

Even if the reception level is somewhat less than −48 dBm, the wireless communication apparatus may successfully receive the corresponding signal because this reception level is sufficiently high compared to the reception performance (reception sensitivity) of the wireless communication apparatus. However, when the reception level is less than −48 dBm, the PHY processing unit 40 avoids determining that CCA is busy (that is, determines that CCA is idle) and notifying the MAC processing unit 10 that CCA is busy. Furthermore, the PHY processing unit 40 avoids passing the payload from the PHY packet to the MAC processing unit 10. Hence, the wireless communication apparatus according to the present embodiment also carries out the above-described virtual carrier sense at the MAC level based on the MAC frame from the PHY packet successfully received at a reception level equal to or greater than −48 dBm.

Operations performed to receive a PHY packet using MCS1 or any higher MCS will be discussed.

First, a case where MCS0 and the rest of MCS1 to MCS12 are categorized into the same PHY scheme will be discussed. In this case, the wireless communication apparatus may use −48 dBm as a carrier sense level for all MCSs. That is, the PHY processing unit 40 may determine that CCA is busy if the reception level for any MCS is equal to or greater than −48 dBm and otherwise determine that CCA is idle.

Next, a case where MCS0 and the rest of MCS1 to MCS12 are categorized into different PHY schemes will be discussed. As described above, when the minimum reception sensitivity level of MCS1, −68 dBm, is used as a carrier sense level for the normal scheme, the difference in carrier sense level between MCS0 and MCS1 for the normal scheme is 10 dB. However, as described above, if the transmission power is limited to 0 dBm, the reception level is −48 dBm (that is, the carrier sense level for MCS0 in the close proximity scheme) at a distance of 3 cm from the transmission source. This reception level is as much as 20 dB greater than the minimum reception sensitivity level of MCS1 based on the normal scheme. Hence, in the close proximity scheme, the wireless communication apparatus can sufficiently receive MCS1 signals even though the carrier sense level for MCS1 is set to −48 dBm, which is the same value as that for MCS0.

That is, the wireless communication apparatus can receive signals based on a given MCS if the difference (for example, 10 dB) between the minimum reception sensitivity (for example, −78 dBm) for the MCS with the minimum transmission rate (for example, MCS0) in the close proximity scheme and the minimum reception sensitivity (for example, −68 dBm) for a given MCS (for example, MCS1) is equal to or smaller than the difference (for example, 30 dBm) between the carrier sense level (for example, −78 dBm) for the normal scheme and the carrier sense level (for example, −48 dBm) for the close proximity scheme. On the other hand, if the difference between the minimum reception sensitivity level of the MCS with the minimum transmission rate in the close proximity scheme and the minimum reception sensitivity level of the given MCS is greater than the difference in carrier sense level between the normal scheme and the close proximity scheme, the communication range for the given MCS is narrower than the communication range (for example, 3 cm) for the MCS with the minimum transmission rate. A decrease in communication range with increasing transmission rate for the MCS is similar to what is called link adaptation and thus poses no problem. Thus, even if MCS0 and the rest of MCS1 to MCS12 are categorized into different PHY schemes, the wireless communication apparatus may use a single carrier sense level (for example, −48 dBm) for the close proximity scheme. That is, the PHY processing unit 40 may determine that CCA is busy if the reception level for any MCS is equal to or greater than −48 dBm and otherwise determine that CCA is idle.

Furthermore, as described above, upon receiving a signal other than those based on the supported PHY scheme, the wireless communication apparatus uses the minimum reception sensitivity plus 20 dB as a carrier sense level. However, even the addition of 20 dB to the minimum reception sensitivity (−68 dBm) for MCS1 does not result in a carrier sense level greater than that for the close proximity level, −48 dBm. Hence, even with the above-described fixed value taken into account, the wireless communication apparatus may use the single carrier sense level (for example, −48 dBm) for the close proximity scheme. That is, the PHY processing unit 40 may determine that CCA is busy if the reception level for any MCS is equal to or greater than −48 dBm and otherwise determine that CCA is idle.

One of the reasons why in the normal scheme, MCS0 and the rest of MCS1 to MCS12 are categorized into different PHY schemes is as follows: in general, in millimeter-wave band communication, a PHY scheme for data frame exchange (that is, any of MCS1 to MCS12) utilizes a high antenna gain (directionality). Here, MCS0 is designed as a PHY scheme covering a wide communication range in order to allow surrounding wireless communication apparatuses to know the presence of one wireless communication group. Specifically, MCS0 is designed as a robust PHY scheme with the widest directionality range (that is, quasi-omni directionality) achievable in the millimeter-wave band in a practical sense. On the other hand, MCS1 to MCS12 are designed according to the policy that the directionality is actively utilized to allow wireless communication apparatuses to actually exchange data frames. Specifically, MCS1 to MCS12 are designed as a PHY scheme in which training on directionality is carried out to increase the antenna again, thus providing a high transmission rate.

On the other hand, for the close proximity scheme, discovery of a communication peer, establishment of a communication link, and exchange of data frames often need to be carried out in a short time. Thus, a PHY scheme may be designed under the policy that the directionality is not necessarily actively utilized. That is, the close proximity scheme may not be designed to transmit management frames such as the beacon frame in accordance with MCS0, in contrast to the normal scheme, but may be designed to transmit management frames in accordance with any of MCS1 to MCS12 as in the case of data frames. In this case, the close proximity scheme does not use MCS0 but one PHY scheme (one of MCS1 to MCS12). However, the above description may be replaced with the phrase "the close proximity scheme is required to achieve the transmission rate for MCS1 at a distance of 3 cm from the transmission source".

Moreover, the close proximity scheme may be designed to be used only for some of MCS1 to MCS12 depending on the requirement for the transmission rate. Also in this case, the wireless communication apparatus may provide one carrier sense level greater than the minimum reception sensitivity in the PHY schemes used and determine the busy/idle state of CCA based on the value of the carrier sense level.

As described above, the wireless communication apparatus according to the first embodiment carries out close proximity wireless communication in accordance with the close proximity scheme using the maximum transmission power limited to a small value compared to the normal scheme (the maximum transmission power is, for example, 10 dBm for the normal scheme and 0 dBm for the close proximity scheme) as well as a carrier sense level greater than that for the normal scheme (the carrier sense level is, for example, −78 dBm for the normal scheme and −48 dBm for the close proximity scheme). Thus, the wireless communication apparatus according to the present embodiment makes the basis for detection of interference with signals from another wireless communication apparatus stricter (more insensitive) than that for the normal scheme. This prevents the wireless communication apparatus based on the close proximity scheme from being inferior to the wireless communication apparatus based on the normal scheme. That is, the wireless communication apparatus based on the normal scheme and the wireless communication apparatus based on the close proximity scheme can coexist equally.

As is apparent from the above discussion, the following occurs if the wireless communication apparatus based on the normal scheme is arranged very close to the wireless communication apparatus using the close proximity scheme. Even when the wireless communication apparatus is set to have the higher carrier sense level for the close proximity scheme, the wireless communication apparatus still detects interference. In this case, the wireless communication apparatuses are desirably shifted to another frequency channel with no interference. This also applies to a case where after the wireless communication apparatus based on the close proximity scheme starts wireless communication, the wireless communication apparatus based on the normal scheme starts wireless communication nearby. Of course, the same also applies to a case where wireless communication apparatuses using the close proximity scheme and belonging to different BSSs are located extremely close to each other. In short, these phenomena are similar to the interference between wireless communication apparatuses using the normal scheme and belonging to different BSSs (that is, wireless communication groups). Thus, a measure similar to that taken for the interference between wireless communication apparatuses using the normal scheme and belonging to different BSSs may be taken for the phenomena. That is, detection of interference in the normal scheme, a change in the frequency channel of a BSS, and the like may be appropriately applied.

Alternatively, the carrier sense level and maximum transmission power of the close proximity scheme may be set by, for example, a functional unit (for example, a MAC/PHY management unit 70 described below) to control the MAC processing unit 10 or the MAC processing unit 10 with a part of the functional unit incorporated therein. Alternatively, the carrier sense level and maximum transmission power of the close proximity scheme may be set automatically or in accordance with an instruction from a person such as a user if the close proximity scheme is used.

Second Embodiment

A wireless communication apparatus according to a second embodiment supplements the wireless communication apparatus according to the first embodiment described above. The wireless communication apparatus according to the present embodiment supports both the above-described close proximity scheme and normal scheme, and can operate in accordance with one of the schemes selected as required. The wireless communication apparatus according to the present embodiment selects the normal scheme by default.

Figure 3:
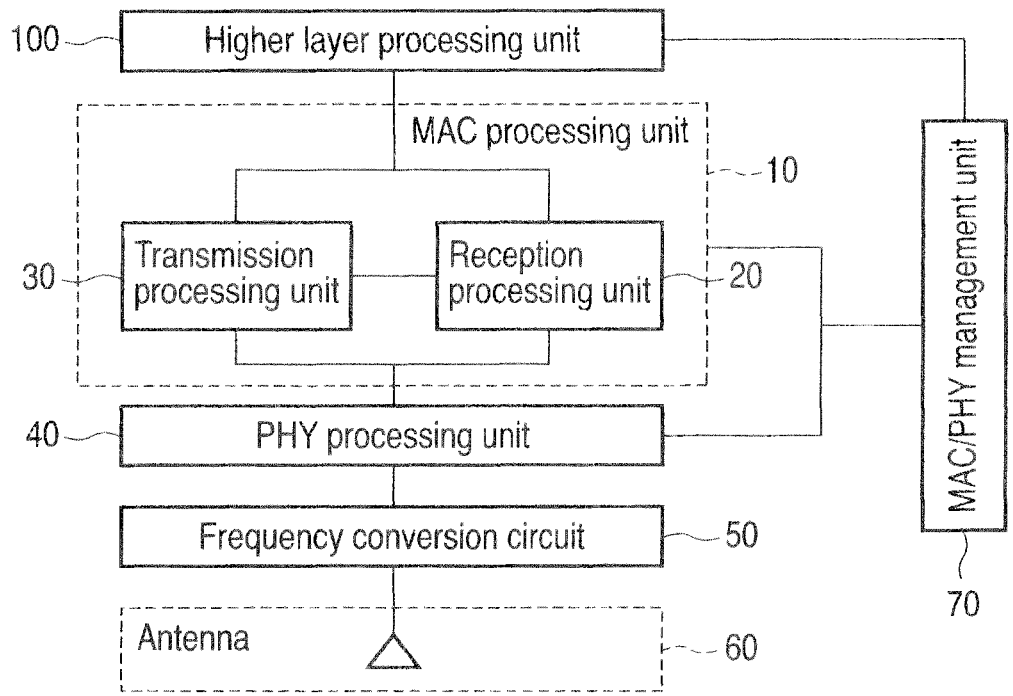
FIG. 3 is a block diagram illustrating a wireless communication apparatus according to a second embodiment.

As illustrated in FIG. 3, the wireless communication apparatus according to the present embodiment includes a higher layer processing unit 100, a MAC processing unit 10, a PHY processing unit 40, a frequency conversion circuit 50, an antenna 60, and a MAC/PHY management unit 70.

The MAC/PHY management unit 70 is connected to each of the higher layer processing unit 100, the MAC processing unit 10 (more specifically, a reception processing unit 20 and a transmission processing unit 30), and the PHY processing unit 40. The MAC/PHY management unit 70 manages MAC and PHY operations in the wireless communication apparatus.

The MAC/PHY management unit 70 corresponds to SME (Station Management Entity) in IEEE 802.11 wireless LAN.

The interface between the MAC/PHY management unit 70 and the MAC processing unit 10 corresponds to MLME SAP (MAC subLayer Management Entity Service Access Point) in IEEE 802.11 wireless LAN. The interface between the MAC/PHY management unit 70 and the PHY processing unit 40 corresponds to PLME SAP (Physical Layer Management Entity Service Access Point) in IEEE 802.11 wireless LAN.

In FIG. 3, the MAC/PHY management unit 70 is shown to include a functional unit for MAC management and a functional unit for PHY management which are integrated with each other. However, the MAC/PHY management unit 70 may be implemented in a different manner provided that the MAC/PHY management unit 70 can achieve the following operations.

The MAC/PHY management unit 70 holds a Management Information Base (MIB). The MIB holds various types of information in order to implement the close proximity scheme.

For example, the MIB holds an attribute indicating whether or not the wireless communication apparatus operates in accordance with the close proximity scheme (whether or not the wireless communication apparatus selects an attribute for the close proximity scheme). Such an attribute can be named, for example, dot11CloseProximityCommunicationEnabled. A TRUE value is set for the attribute when the wireless communication apparatus uses the close proximity scheme. A FALSE value is set for the attribute when the wireless communication apparatus uses the normal scheme. As described above, the attribute is set to FALSE (normal scheme) by default.

For example, when the user selects an application for the close proximity scheme, the MAC/PHY management unit 70 is provided, via the higher layer processing unit 100, with an instruction to rewrite the value of dot11CloseProximityCommunicationEnabled attribute to TRUE. In accordance with the instruction, the MAC/PHY management unit 70 rewrites the value of dot11CloseProximityCommunicationEnabled attribute to TRUE. Alternatively, if the higher layer processing unit 100 selects the close proximity scheme based on a certain algorithm, the rewrite instruction may be provided to the MAC/PHY management unit 70. Furthermore, if the user selects the close proximity scheme, the higher layer processing unit 100 may provide the rewrite instruction to the MAC/PHY management unit 70 or the MAC/PHY management unit 70 may voluntarily carry out the rewriting.

Wireless communication apparatuses configured to support only the normal scheme (in other words, configured not to support the close proximity scheme) do not hold the dot11CloseProximityCommunicationEnabled attribute (need not hold the dot11CloseProximityCommunicationEnabled attribute).

Moreover, the MIB holds attributes specifying the maximum transmission power and carrier sense level, respectively, which are used for the close proximity scheme. The attribute specifying the maximum transmission power can be named, for example, dot11CloseProximityCommunicat0ionMaximumTransmitPowerLevel. The attribute specifying the carrier sense level can be named, for example, dot11CloseProximityCommunicationCarrierSenseLevel. According to the above-described first embodiment, a value for dot11CloseProximityCommunicationMaximumTransmitPowerLevel attribute is set to, for example, 0 dBm. A value for dot11CloseProximityCommunicationCarrierSenseLevel attribute is set to, for example, −48 dBm. Both attribute values may be fixed or may be changed by the higher layer processing unit 100 or the like.

Alternatively, instead of specifying the maximum transmission power and carrier sense level themselves, which are used for the close proximity scheme, the present embodiment may provide attributes specifying other parameters. For example, instead of the maximum transmission power of the close proximity scheme, an attribute may be prepared which specifies the amount by which the maximum transmission power of the close proximity scheme is lower than that for the normal scheme (the amount is, for example, 10 dB according to the first embodiment). Instead of the carrier sense level for the close proximity scheme, an attribute may be prepared which specifies the amount by which the carrier sense level for the close proximity scheme is greater than the minimum reception sensitivity level of the PHY scheme (the amount is, for example, 30 dB according to the first embodiment).

The PHY processing unit 40 operates in accordance with the close proximity scheme if the value of dot11CloseProximityCommunicationEnabled attribute is TRUE. That is, the PHY processing unit 40 carries out transmission so that the transmission power is equal to or lower than the value of dot11CloseProximityCommunicationMaximumTransmitPowerLevel attribute. Furthermore, the PHY processing unit 40 determines that CCA is busy or idle based on the value of dot11CloseProximityCommunicationCarrierSenseLevel attribute.

On the other hand, the PHY processing unit 40 operates in accordance with the normal scheme if the value of dot11CloseProximityCommunicationEnabled attribute is FALSE. That is, PHY processing unit 40 carries out transmission so that the transmission power is equal to or lower than the maximum transmission power of the normal scheme. Furthermore, the PHY processing unit 40 determines that CCA is busy or idle based on the minimum reception sensitivity level of the PHY scheme. The maximum transmission power of the normal scheme is also desirably held in the MIB. An attribute specifying the maximum transmission power of the normal scheme can be named, for example, dot11MaximumTransmitPowerLevel.

The transmission power used by the PHY processing unit 40 may be fixed to the maximum transmission power of the close proximity scheme or the normal scheme.

Alternatively, the MAC processing unit 10 (more specifically, the transmission processing unit 30) may specify a transmission power equal to or lower than the maximum transmission power of the close proximity scheme or the normal scheme and notify the PHY processing unit 40 of the specified transmission power. Alternatively, the user may specify a transmission power equal to or lower than the maximum transmission power of the close proximity scheme or the normal scheme. In this case, the transmission power specified by the user may be communicated to the PHY processing unit 40 via the MAC/PHY management unit 70.

Moreover, the MIB need not necessarily be held in the MAC/PHY management unit 70. For example, the MIB may be held in a common memory unit (not shown in the drawings). The MIB held in the common memory unit may be designed such that the MIB can be referred to (read) by the MAC/PHY management unit 70, the MAC processing unit 10, and the PHY processing unit 40 and that the MAC/PHY management unit 70 can rewrite rewritable attributes.

As described above, in the wireless communication apparatus according to the second embodiment, the MIB holds various attributes for the close proximity scheme. Thus, the wireless communication apparatus according to the present embodiment can support both a close proximity scheme and normal scheme and operate appropriately by selecting one of the schemes.

Third Embodiment

A wireless communication apparatus according to a third embodiment supplements the wireless communication apparatuses according to the first and second embodiments described above. In the present embodiment, formation and maintenance of a wireless communication group based on the close proximity scheme (for example, the BSS in IEEE 802.11) will be described. That is, according to the present embodiment, wireless communication apparatuses configured to support the close proximity scheme form a BSS for the close proximity scheme.

In general, in IEEE 802.11, when a BSS is formed, two types of wireless communication apparatuses are present; one type of the wireless communication apparatuses transmits a beacon frame (management frame) (in the present embodiment, the wireless communication apparatus providing this function is referred to as a first wireless communication apparatus for convenience), and the other type of wireless communication apparatus receives the beacon frame (in the present embodiment, the wireless communication apparatus providing this function is referred to as a second wireless communication apparatus for convenience). The second wireless communication apparatus adjusts the operation thereof so that the operation matches the attribute of the BSS based on the information in the received beacon frame. The second wireless communication apparatus further synchronizes the information thereof (for example, a timer value described later) with the synchronization information in the beacon frame. The first wireless communication apparatus periodically transmits the beacon frame in order to form and maintain a BSS during a period before formation of the BSS (that is, the period when the second wireless communication apparatus joining the BSS is not present) and during a period after the formation of the BSS.

The second wireless communication apparatus may search for the first wireless communication apparatus based on the received beacon frame (this search is what is called a passive scan). Alternatively, in order to reduce the search time, the second wireless communication apparatus may search for the first wireless communication apparatus by transmitting a management frame to search for the first wireless communication apparatus (for example, a probe request frame in IEEE 802.11) and receiving a response frame (for example, a probe response frame in IEEE 802.11) from the first wireless communication apparatus (this search is what is called an active scan). The probe response frame carries information similar to that in the beacon frame. Hence, the second wireless communication apparatus can acquire required information of the probe response frame instead of from the beacon frame.

The beacon frame is basically transmitted omni-directionally. However, in the millimeter-wave band, an antenna pattern is expected to be quasi-omni-directional depending on the design. In this case, the wireless communication apparatuses need to match the directions of the antenna patterns thereof with each other to some degree. Thus, the second wireless communication apparatus configured to carry out an active scan (configured to transmit a probe request) may initially transmit the beacon frame to the first wireless communication apparatus.

Here, a BSS based on the close proximity scheme is a wireless communication group formed by a plurality of wireless communication apparatuses using the close proximity scheme. Thus, with a few exceptions, a wireless communication apparatus not supporting the close proximity scheme cannot join the BSS based on the close proximity scheme.

The wireless communication apparatus according to the present embodiment carries information indicating that the BSS has an attribute for the close proximity scheme, in a frame body field of a beacon frame/probe response frame transmitted for the BSS based on the close proximity scheme. Thus, upon receiving the beacon frame/probe response frame, the wireless communication apparatus can determine whether or not the searched-for BSS is based on the close proximity scheme.

Figure 4:
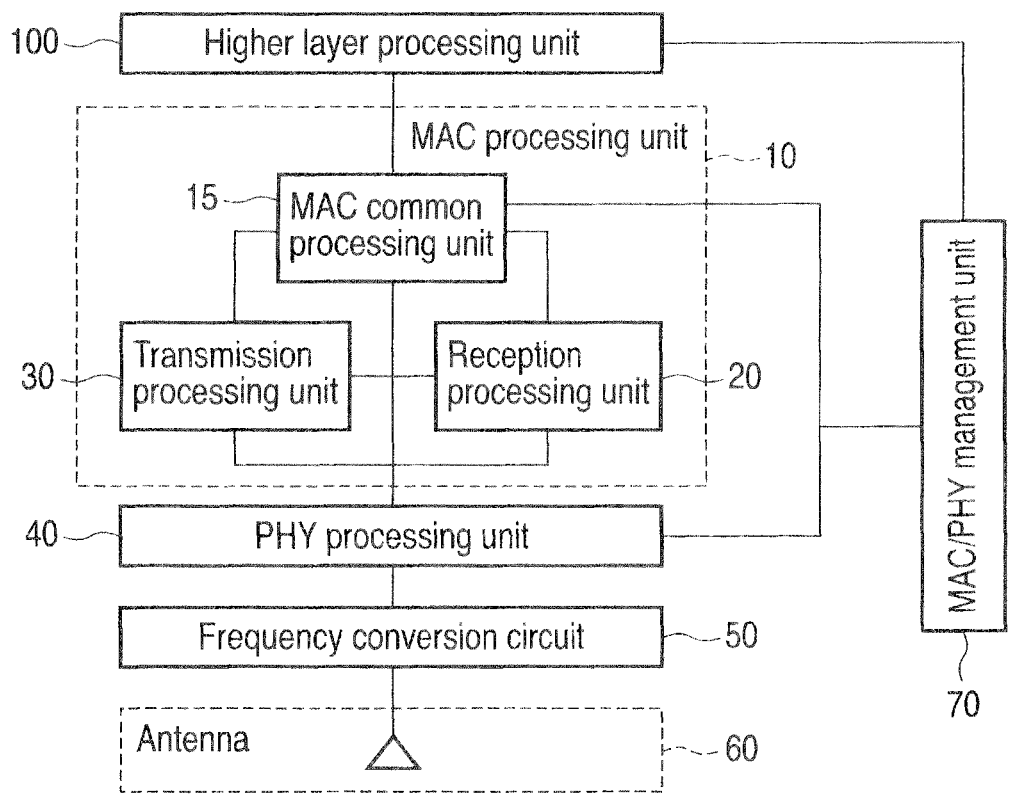
FIG. 4 is a block diagram illustrating a wireless communication apparatus according to a third embodiment.

In the wireless communication apparatus according to the present embodiment, the MAC processing unit 10 includes a MAC common processing unit 15 as illustrated in FIG. 4. The MAC common processing unit 15 exchanges signals with the MAC/PHY management unit 70. Specifically, the MAC common processing unit 15 receives an instruction from the MAC/PHY management unit 70. Then, the MAC common processing unit 70 converts the instruction into one suitable for the reception processing unit 20 and the transmission processing unit 30, and outputs the resultant instruction. Furthermore, the MAC common processing unit 15 is connected to the higher layer processing unit 100. Hence, the MAC common processing unit 15 intermediates each of delivery of received data from the reception processing unit 20 to the higher layer processing unit 100 and delivery of transmitted data from the higher layer processing unit 100 to the transmission processing unit 30.

An operation of the wireless communication apparatus according to the present embodiment will be described below which is performed when the wireless communication apparatus carries the information indicating that the BSS has the attribute for the close proximity scheme in the frame body field of the beacon frame/probe response frame transmitted for the BSS based on the close proximity scheme.

In the wireless communication apparatus according to the present embodiment, the MIB holds the dot11CloseProximityCommunicationEnabled attribute as in the case of the above-described second embodiment. When the MAC/PHY management unit 70 outputs an instruction (for example, a primitive called MLME-START.request in IEEE 802.11) to start (formation of) a BSS, a process of transmitting a beacon frame is started. Upon receiving the instruction, the MAC common processing unit 15 refers to the value of dot11CloseProximityCommunicationEnabled attribute. If the value is TRUE, the MAC common processing unit 15 generates a frame body which carries information indicating that the BSS has the attribute for the close proximity scheme. The MAC common processing unit 15 then periodically provides the transmission processing unit 30 with an instruction to transmit a beacon frame containing the frame body. The intervals (Beacon Interval or Beacon Period) at which the beacon frame is transmitted are specified in, for example, the above-described instruction to start a BSS. Alternatively, the beacon interval may be specified in the MIB, and in this case, the MAC common processing unit 15 may refer to the MIB. Based on the carrier sense information from the reception processing unit 20, the transmission processing unit 30 transmits the beacon frame via the PHY processing unit 40, the frequency conversion circuit 50, and the antenna 60.

On the other hand, when the wireless communication apparatus according to the present embodiment receives a probe request frame from another wireless communication apparatus (corresponding to the second wireless communication apparatus), the reception processing unit 20 passes the probe request frame to the MAC common processing unit 15. If the requirement specified in the frame body of the probe response frame is met, the MAC common processing unit 15 generates and passes a frame body of a probe response frame to the transmission processing unit 30. However, the MAC common processing unit 15 generates the frame body of the probe response frame depending on the value of dot11CloseProximityCommunicationEnabled attribute. Specifically, if the value of dot11CloseProximityCommunicationEnabled attribute is TRUE, the MAC common processing unit 15 needs to generate a frame body which holds information indicating that the BSS has the attribute for the close proximity scheme. Based on carrier sense information from the reception processing unit 20, the transmission processing unit 30 transmits the probe response frame via the PHY processing unit 40, the frequency conversion circuit 50, and the antenna 60.

The information indicating that the BSS has the attribute for the close proximity scheme can be inserted in the frame body field of the beacon frame/probe response frame in a manner exemplified below. A possible definition is such that if in the normal scheme, a field indicative of the attribute of the BSS is provided and includes a reserved portion, the reserved position can be used to carry the information. For example, the following assumptions are made: the close proximity scheme is used only for the millimeter-wave band, the normal scheme on which the close proximity scheme is based is present in the millimeter-wave band, a field indicative of the attribute of operation in the millimeter-wave band is provided in the frame body field of the beacon frame/probe response frame as an information element (IE), and at least 1 bit in the field indicative of the operation attribute is reserved. In this case, a possible definition is such that the reserved bit can be used to represent the information indicating whether or not the BSS in operation has the attribute for the close proximity scheme. That is, the MAC common processing unit 15 sets the value of the bit to 1 if the BSS in operation has the attribute for the close proximity scheme, and otherwise (for example, if the BSS in operation has an attribute for the normal scheme) keeps the value of the bit unchanged (i.e., 0).

The wireless communication apparatus configured to support the close proximity scheme (and corresponding to the second wireless communication apparatus) can recognize whether or not the BSS is operated in accordance with the close proximity scheme by, for example, extracting the IE, which is indicative of the attribute of operation in the millimeter-wave band, to refer to the value of the bit in which the information indicating whether or not the BSS has the attribute for the close proximity scheme. On the other hand, the wireless communication apparatus configured not to support the close proximity scheme may ignore the value of the bit which indicates the information whether or not the BSS has the attribute for the close proximity scheme because the wireless communication apparatus need not recognize the bit. Alternatively, the wireless communication apparatus configured not to support the close proximity scheme may recognize that 1 is set in the bit that should be reserved, that is, should be set to 0. The wireless communication apparatus may then determine that a wireless communication scheme not supported by the wireless communication apparatus is required by the BSS, and refrain from joining the BSS.

Now, the operation of the wireless communication apparatus (that is, the wireless communication apparatus supports at least the close proximity scheme) according to the present embodiment when joining a BSS will be described.

Upon determining to search for a BSS, the MAC/PHY management unit 70 outputs an instruction to search for a BSS, to the MAC common processing unit 15. The search instruction corresponds to an MLME-SCAN.request primitive in IEEE 802.11. The primitive includes parameters illustrated in FIG. 6.

When the Scan Type parameter indicates the passive scan, the MAC common processing unit 15 refers to the Channel List parameter and instructs the PHY processing unit 40 to shift to a specified frequency channel. Then, the MAC common processing unit 15 collects information of beacon frames among management frames received via the PHY processing unit 40 and the reception processing unit 20 during a period equal to or longer than the Min Channel Time and equal to or shorter than the Max Channel Time. Here, if the instruction to search for a BSS includes a limitation for a target condition, the MAC common processing unit 15 collects information only of the beacon frames meeting the target condition. If a plurality of frequency channels are specified in the Channel List, the MAC common processing unit 15 performs the above-described passive scan operation for each of the specified frequency channels. Once a series of passive scan operations ends, the MAC common processing unit 15 passes the collected information of beacon frames to the MAC/PHY management unit 70.

On the other hand, when the Scan Type parameter indicates the active scan, the MAC common processing unit 15 generates a frame body of a probe request frame in accordance with the input instruction. The MAC common processing unit 15 passes the probe request frame to the transmission processing unit 30 so that the probe request frame is transmitted in accordance with a BSS search condition (for example, the Probe Delay parameter in FIG. 6) in each of the specified frequency channels. Unlike in the case of the passive scan, in case of the active scan the MAC common processing unit 15 collects information of probe response frames instead of that of beacon frames. As in the case of the passive scan, if a plurality of frequency channels are specified in the Channel List, the MAC common processing unit 15 performs the above-described active scan operation for each of the specified frequency channels. Once a series of active scan operations ends, the MAC common processing unit 15 passes the collected information of probe response frames to the MAC/PHY management unit 70.

As illustrated in FIG. 6, the BSS search instruction from the MAC/PHY management unit 70 can include the BSS Type parameter to specify the type of a BSS under scan. If this parameter can specify whether the target BSSs are those based on the close proximity scheme, the MAC common processing unit 15 can utilize the parameter when collecting information of beacon frames/probe response frames. That is, when the MAC/PHY management unit 70 provides the MAC common processing unit 15 with a search instruction including the BSS Type specifying a BSS based on the close proximity scheme, the MAC common processing unit 15 collects only the beacon frames/probe response frames which carry the information indicating that the BSS has the attribute for the close proximity scheme.

Furthermore, if the MAC/PHY management unit 70 provides the MAC common processing unit 15 with a search instruction including the BSS Type specifying a BSS based on the close proximity scheme, it is efficient that the MAC/PHY management unit 70 correspondingly rewrites the value of the dot11CloseProximityCommunicationEnabled attribute to TRUE. As a result of the rewrite process, the PHY processing unit 40 uses the carrier sense level for the close proximity scheme. In other words, the MAC common processing unit 15 collects only the beacon frames/probe response frames with a reception level equal to or greater than the carrier sense level for the close proximity scheme. Thus, the MAC processing unit 15 can confirm, before joining the BSS, that a signal from the BSS corresponding to the collected beacon frames/probe response frames is received at the carrier sense level for the close proximity scheme or higher. Hence, the rewrite process can avoid a situation in which the signal from the target BSS to join fails to meet the carrier sense level for the close proximity scheme, resulting in unable to realize the close proximity communication.

The MAC/PHY processing unit 70 determines the BSS which the wireless communication apparatus is to join based on the information of the beacon frames/probe response frames collected by the MAC common processing unit 15 through the passive scan/active scan. The MAC/PHY management unit 70 provides the MAC common processing unit 15 with an instruction (for example, the MLME-JOIN.request primitive in IEEE 802.11) to join a particular BSS.

Due to a reason such as an application request permits both the normal scheme and the close proximity scheme, the higher layer 100 may provide the MAC/PHY management unit 70 with a BSS search instruction specifying neither the normal scheme nor the close proximity scheme. Here, the value of dot11CloseProximityCommunicationEnabled attribute is FALSE. The MAC/PHY management unit 70 provides the MAC common processing unit 15 with a BSS search instruction not specifying the type of the BSS (whether or not the BSS is based on the close proximity scheme). Even in this case, the MAC common processing unit 15 can collect information of the beacon frames/probe response frames whose BSSs are based on the close proximity scheme and notify the MAC/PHY management unit 70 of the information. However, since the value of dot11CloseProximityCommunicationEnabled attribute is FALSE as described above, the wireless communication apparatus uses the transmission power and carrier sense level for the normal scheme. That is, more precisely, if a BSS based on the close proximity scheme is present which transmits signals providing a reception power equal to or greater than the carrier sense level for the normal scheme, the MAC common processing unit 15 can collect information of the beacon frames/probe response frames for the BSS based on the close proximity scheme.

However, to join the BSS based on the close proximity scheme, the wireless communication apparatus needs to rewrite the value of dot11CloseProximityCommunicationEnabled attribute to TRUE and to use the transmission power and carrier sense level for the close proximity scheme. Thus, the fact that the wireless communication apparatus can scan the BSS based on the close proximity scheme is not equivalent to the fact that the wireless communication apparatus can achieve the close proximity communication after joining the BSS. Specifically, the reception level of the signal from the BSS based on the close proximity scheme may be less than the carrier sense level for the close proximity scheme, which results in inability to realize the close proximity communication.

Thus, if the wireless communication apparatus according to the present embodiment supports both the normal scheme and the close proximity scheme as in the case of the second embodiment, the following operations are effective. Specifically, the MAC common processing unit 15 adds the reception level of the beacon frames/probe response frames collected by the scan operation to the information of the frames (information on the BSS). The MAC common processing unit 15 then notifies the MAC/PHY management unit 70 of the resultant information. This notification corresponds to an MLME-SCAN.confirm primitive in IEEE 802.11. If such primitive is used as a precondition, the above-described operation can be implemented by adding an item describing the reception level to a parameter called BSSDescription expressing all pieces of BSS information. For example, the PHY processing unit 40 passes a MAC frame and the reception level of the MAC frame to the reception processing unit 20. Furthermore, the reception processing unit 20 passes at least the information of the beacon frame/probe response frame and the reception level of the frame to the MAC common processing unit 15. The MAC common processing unit 15 can pass, in addition to the scan result, the reception level of the beacon frame/probe response frame to the MAC/PHY management unit 70 as accompanying information on each BSS. If the scanned BSS has the attribute for the close proximity scheme, the MAC/PHY management unit 70 may determine, based on the reception level, whether or not the wireless communication apparatus can join the BSS based on the close proximity scheme (whether or not a reception level equal to or greater than the carrier sense level for the close proximity scheme is obtained if the wireless communication apparatus joins the BSS).

Furthermore, for example, dot11CloseProximityCommunicationImplemented attribute can be defined as an attribute indicating whether or not the wireless communication apparatus supports the close proximity scheme. The attribute is held, for example, in the MIB. That is, if the attribute value is TRUE (indicating that the wireless communication apparatus supports the close proximity scheme), the MAC common processing unit 15 may pass, in addition to the scan result, the reception level of the beacon frame/probe response frame to the MAC/PHY management unit 70. On the other hand, if the attribute value is FALSE (indicating that the wireless communication apparatus does not support the close proximity scheme), the MAC common processing unit 15 may simply pass the scan result to the MAC/PHY management unit 70 (that is, the MAC common processing unit 15 need not pass the reception level to the MAC/PHY management unit 70). Moreover, if this attribute fails to be defined, the MAC common processing unit 15 may determine the wireless communication apparatus not to support the close proximity scheme and behave in the same manner as that in the case where the attribute value is FALSE. If dot11CloseProximityCommunicationImplemented attribute is defined and its value is set to TRUE, then the above-described dot11CloseProximityCommunicationEnabled attribute is also defined and set to TRUE or FALSE.

For example, the MAC/PHY management unit 70 determines the BSS to be joined by the wireless communication apparatus based on collected valid BSS candidates (that is, BSS candidates determined, based on, for example, the reception level, to be able to carry out close proximity communication if the wireless communication apparatus joins the BSS) as well as the requirement from the application in the higher layer. If the determined BSS has the attribute for the close proximity scheme, the MAC/PHY management unit 70 rewrites the value of the dot11CloseProximityCommunicationEnabled attribute to TRUE to switch the transmission power and carrier sense level to those used by the close proximity scheme. The operation of joining the BSS based on the close proximity scheme is similar to the operation of joining the BSS based on the normal scheme. That is, the wireless communication apparatus receives a beacon frame for the BSS based on the close proximity scheme. The wireless communication apparatus then adjusts the operation thereof so that the operation matches the attribute of the BSS based on the information in the received beacon frame. The wireless communication apparatus further synchronizes the information thereof (for example, a timer value described later) with the synchronization information in the beacon frame.

The information indicating that the BSS has the attribute for the close proximity scheme may be carried in an association response frame. The association response frame is transmitted to the second wireless communication apparatus by the first wireless communication apparatus if the second wireless communication apparatus transmits an association request frame to the first wireless communication apparatus. When the information indicating that the BSS has the attribute for the close proximity scheme is carried in an association response frame, the second wireless communication apparatus can confirm, during an association process, that the BSS has the attribute for the close proximity scheme.

The above description relates to the operation in which the wireless communication apparatus according to the present embodiment joins the BSS based on the close proximity scheme and the operation in which the wireless communication apparatus according to the present embodiment operates the BSS based on the close proximity scheme. The following specification requirement is expected: for the close proximity communication, a wireless communication apparatus using the close proximity scheme desires to communicate only with wireless communication apparatuses also using the close proximity scheme. According to the specification requirement, joining, to the BSS, of a wireless communication apparatus configured not to support the close proximity scheme is preferably excluded or limited. The description below relates to the operation in which the wireless communication apparatus according to the present embodiment operates the BSS based on the close proximity scheme and excludes or limits the joining, to the BSS, of a wireless communication apparatus configured not to support the close proximity scheme.

In IEEE 802.11, the joining to the BSS is defined such that the second wireless communication apparatus adjusts its operation to match the attribute of the BSS and synchronizes its information with the synchronization information. Thus, the second wireless communication apparatus can join the BSS without the need for an authentication procedure based on exchange of frames with the first wireless communication apparatus. If the value of the above-described dot11CloseProximityCommunicationImplemented attribute is TRUE and the second wireless communication apparatus desires to join the BSS based on the normal scheme, then the second wireless communication apparatus may recognize that the BSS has the attribute for the close proximity scheme based on the beacon frame and the like and refrain from joining the BSS based on the close proximity scheme. However, if the value of the attribute is FALSE or the attribute fails to be defined, the second wireless communication apparatus does not support the close proximity scheme (supports only the normal scheme). Hence, the second wireless communication apparatus may fail to recognize that the BSS has the attribute for the close proximity scheme. That is, the wireless communication apparatus configured not to support the close proximity scheme may join the BSS based on the close proximity scheme by adjusting its operation to match the attribute of the BSS and synchronizing its information with the synchronization information. Consequently, it is difficult to exclude or limit the joining itself, to the BSS based on the close proximity scheme, of the wireless communication apparatus configured not to support the close proximity scheme. Thus, first, a technique will be described which excludes or limits the transmission, by the wireless communication apparatus configured not to support the close proximity scheme, of data frames to the wireless communication apparatus that is joining the BSS based on the close proximity scheme.

IEEE 802.11 provides an association process. For the BSS based on the close proximity scheme, a possible specification is such that exchange of data frames is not allowed to start until the association process completes. That is, the wireless communication apparatus that is to join the BSS based on the close proximity scheme needs to complete the association process before starting exchanging data frames.

The second wireless communication apparatus transmits an association request frame to the first wireless communication apparatus during the association process. Information indicating whether or not the second wireless communication apparatus supports the close proximity scheme is carried in a frame body field in the association request frame. For example, the following assumptions are made: the close proximity scheme is used only in the millimeter-wave band; the normal scheme on which the close proximity scheme is based is present in the millimeter-wave band; the association request frame based on the normal scheme contains a field indicative of the capability of the wireless communication apparatus in the millimeter-wave band; and at least 1 bit in this field is reserved. In this case, a possible definition is such that the reserved bit is used to represent the information indicating whether or not the second wireless communication apparatus supports the close proximity scheme. That is, if the value of the dot11CloseProximityCommunicationImplemented attribute is TRUE, and the value of the dot11CloseProximityCommunicationEnabled attribute is FALSE (default), then the MAC common processing unit 15 of the second wireless communication apparatus sets the particular bit to 1 when generating the frame body of the association request frame, in accordance with an instruction from the MAC/PHY management unit 70. On the other hand, if the value of the dot11CloseProximityCommunicationImplemented attribute is FALSE, the MAC common processing unit 15 of the second wireless communication apparatus keeps the particular bit unchanged (i.e., 0).

Then, the first wireless communication apparatus operating the BSS based on the close proximity scheme receives the association request frame and checks the value of the particular bit. If the value of the particular bit is 0, the first wireless communication apparatus rejects the association. Specifically, the first wireless communication apparatus sets Reject in a status code in the association response frame, and transmits the association response frame to the second wireless communication apparatus. Here, the status code may additionally describe the reason of rejection that the second wireless communication apparatus does not support the close proximity scheme. On the other hand, if the value of the particular bit is 1, the first wireless communication apparatus can permit the association depending on other conditions. To permit the association, the first wireless communication apparatus sets Successful in the status code in the association response frame, and transmits the association response frame to the second wireless communication apparatus. Upon recognizing that the association is permitted based on the association response frame, the second wireless communication apparatus rewrites the value of the dot11CloseProximityCommunicationEnabled attribute to TRUE, and then starts using the close proximity scheme.

In the above description, when the value of the dot11CloseProximityCommunicationImplemented attribute is TRUE, and the value of the dot11CloseProximityCommunicationEnabled attribute is FALSE, 1 is set in the particular bit in the association request frame. According to the above-described technique, the value of the dot11CloseProximityCommunicationEnabled attribute remains FALSE until the association is permitted. That is, the switching, by the wireless communication apparatus, between the use and non-use of the close proximity scheme depends on a response from another wireless communication apparatus.

Thus, the above-described technique can be modified as follows. Specifically, as described above, the wireless communication apparatus configured to support the close proximity scheme (the value of the dot11CloseProximityCommunicationImplemented attribute is TRUE) can rewrite the value of the dot11CloseProximityCommunicationEnabled attribute to TRUE upon determining to join the BSS based on the close proximity scheme. Setting 1 in the particular bit is also effective if the wireless communication apparatus transmits an association request frame. Specifically, for example, the MAC/PHY management unit 70 receives scan results (information on searches for peripheral BSSs) from the MAC common processing unit 15 using MLME-SCAN-.confirm. The MAC/PHY management unit 70 can select a BSS based on the close proximity scheme from the scan results and determine to join the BSS. The MAC/PHY management unit 70 instructs the MAC common processing unit 15 to join the BSS based on the close proximity scheme using MLME-JOIN.request. The MAC/PHY management unit 70 then rewrites the value of the dot11CloseProximi0 tyCommunicationEnabled attribute to TRUE. Then, the MAC/PHY management unit 70 outputs an MLME-ASSOCIATION.request to the MAC common processing unit 15. In response, the MAC common processing unit 15 generates a frame body of association request frame. At this time, the MAC common processing unit 15 refers to the value of the dot11CloseProximityCommunicationEnabled attribute. If the value is TRUE, the MAC common processing unit 15 sets 1 in the particular bit in the frame body field of the association request frame. On the other hand, if the value of the dot11CloseProximityCommunicationEnabled attribute is FALSE, the MAC common processing unit 15 keeps the particular bit in the frame body of the association request frame unchanged (i.e., 0). According to this technique, the wireless communication apparatus uses the transmission power and carrier sense level for the close proximity scheme to transmit the association request frame. Thus, the wireless communication apparatus can determine whether or not the frame exchange for the association is carried out within the communication range for the close proximity scheme. Specifically, if the wireless communication apparatus fails to receive an association response frame within a predetermined time after the transmission of the association request frame, the wireless communication apparatus can determine that the reception level for the association request frame at the communication peer (that is, the above-described first wireless communication apparatus) is less than the carrier sense level for the close proximity scheme. That is, the wireless communication apparatus can determine that the distance from the communication peer exceeds the communication range for the close proximity scheme. The MAC/PHY management unit 70 can specify the duration for which the wireless communication apparatus waits for an association response frame. Furthermore, in providing the MAC common processing unit 15 with an MLME-ASSOCIATION.request, the MAC/PHY management unit 70 can notify the MAC common processing unit 15 of the duration specified in the primitive in the MLME-ASSOCIATION.request.

Now, a technique will be described which excludes or limits the transmission of data frames by the wireless communication apparatus configured not to support the close proximity scheme after joining a BSS based on the close proximity scheme.

For example, the first wireless communication apparatus can create a schedule in which wireless communication apparatuses for which the association is not permitted are prevented from transmitting data frames during the beacon interval. If the normal scheme on which the close proximity scheme is based involves a mechanism in which the wireless communication apparatuses joining a BSS transmit frames in accordance with the transmission schedule for the beacon interval, the mechanism can also be utilized for the close proximity scheme. Specifically, as illustrated in FIG. 5, the first wireless communication apparatus may create a schedule in which management frames such as the association request frame can be transmitted only during a given period of the beacon interval and that only the first wireless communication apparatus or the wireless communication apparatuses for which the first wireless communication apparatus permits the association can transmit data frames during all of the remaining period of the beacon interval. The schedule information is provided to each wireless communication apparatus via the beacon frame.

In FIG. 5, the first wireless communication apparatus is denoted by "STA1", and one wireless communication apparatus for which the first wireless communication apparatus permits the association is denoted by "STA2". That is, in the example illustrated in FIG. 5, no period is scheduled for the wireless communication apparatuses other than STA1 and STA2 to transmit data frames. In FIG. 5, during a management frame transmission enabled period, management frames such as the association request frame are transmitted. However, the first wireless communication apparatus can also designate certain wireless communication apparatuses permitted to transmit data frames during the management frame transmission enabled period.

The wireless communication apparatus configured not to support the close proximity scheme may not be able to recognize that the BSS joined by the wireless communication apparatus has the attribute for the close proximity scheme. However, no period is scheduled for the wireless communication apparatus to transmit data frames, and thus the wireless communication apparatus can not transmit any data frames. Thus, the wireless communication apparatus configured not to support the close proximity scheme may desire to have its transmission period scheduled and generate and transmit an association request frame to the first wireless communication apparatus during the management frame transmission enabled period. However, the wireless communication apparatus configured not to support the close proximity scheme cannot set the particular bit, which is prepared in the association request frame to indicate whether or not the close proximity scheme is supported, to 1. Thus, the first wireless communication apparatus can reject the association with the wireless communication apparatus configured not to support the close proximity scheme. Even if a certain management frame is defined to request scheduling of a transmission period, similar effects can be exerted by defining the particular bit as in the case with the association request frame (that is, a schedule request from the wireless communication apparatus configured not to support the close proximity scheme may be rejected or the transmission period for the wireless communication apparatus may be excluded from the schedule).

Furthermore, it is also effective to limit the transmission period of the wireless communication apparatus whose association is not permitted (that is, the wireless communication apparatus configured not to support the close proximity scheme) within the beacon interval. Specifically, the management frame transmission enabled period in the example illustrated in FIG. 5 may be replaced with a contention period. During the contention period, transmissible frames are not limited to the management frames, and the wireless communication apparatus which can transmit frames is also not limited. According to this schedule, the wireless communication apparatus configured not to support the close proximity scheme can transmit data frames only during the contention period. It is desirable to set the contention period short enough to satisfy a transmission request (QoS (Quality of Service) request) from the wireless communication apparatus utilizing the close proximity scheme. When the contention period is set to be sufficiently short, even if the wireless communication apparatus configured not to support the close proximity scheme joins a BSS based on the close proximity scheme, frame transmission from such wireless communication apparatus is substantially prevented from obstructing frame transmission from the wireless communication apparatus utilizing the close proximity scheme.

Additionally, if a parameter essential for joining the BSS in connection with the attribute of the BSS can be defined, this mechanism is also effectively utilized. Specifically, in connection with such a parameter, the above-described first wireless communication apparatus inserts a code that can be understood by the wireless communication apparatus configured to support the close proximity scheme and which cannot be understood by the wireless communication apparatus configured not to support the close proximity scheme. Insertion of the code allows the wireless communication apparatus configured not to support the close proximity scheme to be excluded from the BSS based on the close proximity scheme. For example, it is assumed that an IE indicative of an MCS set used for the BSS is present and that a method is available which indicates, in the IE, an MCS essential for reception in the BSS. The first wireless communication apparatus utilizes this method to define a code that is not actually indicating an MCS, but for the close proximity scheme. The wireless communication apparatus configured to support the close proximity scheme understands that the code is defined for the close proximity scheme and can join the BSS. On the other hand, the wireless communication apparatus configured not to support the close proximity scheme cannot understand the code. Furthermore, the MCS indicated by the code is defined to be essential for reception in the BSS. Therefore, the wireless communication apparatus cannot join the BSS (cannot give an instruction to join the BSS).

In addition, for the normal scheme on which the close proximity scheme is based, if a frame is defined to expel certain wireless communication apparatuses from the BSS, the frame can be effectively utilized. Specifically, upon recognizing that the wireless communication apparatus configured not to support the close proximity scheme is joining the BSS based on the close proximity scheme, the first wireless communication apparatus may transmit the frame to expel the wireless communication apparatus from the BSS. However, the first wireless communication apparatus may fail to recognize that the wireless communication apparatus configured not to support the close proximity scheme is joining the BSS based on the close proximity scheme until the wireless communication apparatus starts exchanging data frames.

As described above, according to the wireless communication apparatus of the third embodiment, the wireless communication apparatuses supporting the close proximity scheme can form a BSS based on the close proximity scheme. In the description of the present embodiment and other embodiments, specific management frames such as the beacon frame and the probe response frame are exemplified. However, these frames may be replaced with other management frames.

Fourth Embodiment

A wireless communication apparatus according to a fourth embodiment supplements the above-described wireless communication apparatuses according to the first to third embodiments. Specifically, the wireless communication apparatus according to the present embodiment enables connections based on the close proximity scheme without depending on network identifiers provided in the normal scheme.

For example, IEEE 802.11 specifies an SSID (Service Set IDentifier), which is an identifier of a network including the BSS, as a piece of information indicative of the attribute of the BSS. A use case is possible in which in connection with the close proximity scheme, communication starts immediately when wireless communication apparatuses come close to each other. With this use case taken into account, even if the normal scheme requires an SSID, the close proximity scheme may require not to limit the communication peer nor to ask the network identifier.

Thus, if the close proximity scheme needs to follow the policy of the normal scheme and to specify a certain SSID, the wireless communication apparatus according to the present embodiment may for example, use a random number counter or utilize an identifier specific to the wireless communication apparatus having started a BSS based on the close proximity scheme to temporarily determine an SSID. Then, the wireless communication apparatuses joining the BSS based on the close proximity scheme may ignore the SSID.

As described above, the wireless communication apparatus according to the fourth embodiment ignores the network identifier in the BSS based on the close proximity scheme. Thus, the wireless communication apparatus according to the present embodiment can realize close proximity communication which is suitable for the use case expected for the close proximity scheme.

Fifth Embodiment

A wireless communication apparatus according to a fifth embodiment supplements the above-described wireless communication apparatuses according to the first to fourth embodiments. The wireless communication apparatus according to the present embodiment reduces the time required before starting exchange of data frames in the close proximity scheme compared to that in the normal scheme.

Here, some use cases of the close proximity communication require a reduction in the time required before starting the data communication (that is, exchange of data frames). In other words, the time required to set up a communication link is desired to be reduced.

The time required to set up a communication link includes many elements; for example, the time required to select a channel on which a BSS based on the close proximity scheme operates, the time required to search for a BSS based on the close proximity scheme, and the time for negotiation required if wireless communication apparatuses configured to periodically transmit beacon frames contend with each other. Some use cases of the close proximity communication may relate to only some of these elements.

First, a reduction in the time required to select a channel on which a BSS based on the close proximity scheme operates will be described. According to the above-described first embodiment, since the close proximity scheme uses a higher carrier sense level than the normal scheme (the carrier sense level of the normal scheme is the minimum reception sensitivity level of the physical scheme), the probability of detecting interference in the close proximity scheme is lower than that in the normal scheme. Hence, in selection of the channel on which the BSS based on the close proximity scheme operates, the number of candidate channels (channels with less interference) for the close proximity scheme is likely to be greater than that for the normal scheme, in other words, it is likely to be easier to find a clear channel. Thus, the wireless communication apparatus according to the present embodiment uses a carrier sense level similar to that in the first embodiment to enable a reduction in the time required to select the channel on which the BSS based on the close proximity scheme operates.

Now, a reduction in the time required to search for a BSS based on the close proximity scheme will be described. The time required for the search depends on the maximum beacon interval likely to be used for the BSS. Thus, the wireless communication apparatus according to the present embodiment limits the maximum beacon interval for the close proximity scheme so that the maximum beacon interval for the close proximity scheme is shorter than that for the normal scheme. For example, the wireless communication apparatus sets the maximum beacon interval for the normal scheme to 1 s, while setting the maximum beacon interval for the close proximity scheme to 10 ms. With this setting, when the wireless communication apparatus searches for a BSS based on the close proximity scheme on a particular frequency channel by means of a passive scan, the search may continue for 10 ms. On the other hand, when the wireless communication apparatus searches for a BSS based on the normal scheme on a particular frequency channel by means of a passive scan, the search needs to continue for 1 s. Consequently, the time required for the passive scan in the close proximity scheme may be shorter than that in the normal scheme.

On the other hand, for the active scan, a procedure may be carried out in which wireless communication apparatuses using the millimeter-wave band to transmit the beacon frame to each other to adjust the directivity angle of the antenna. In the procedure, if the beacon interval is randomly selected from the range equal to or smaller than the maximum beacon interval, the maximum beacon interval for the close proximity scheme can be effectively limited so as to be shorter than that for the normal scheme. That is, the time required for the active scan may be set to be shorter for the close proximity scheme than for the normal scheme.

Now, a reduction in the time required for negotiation required when wireless communication apparatuses periodically transmitting beacon frames contend with each other will be described. For example, it is assumed that each of the two wireless communication apparatuses has started an application using the close proximity scheme and is forming a BSS based on the close proximity scheme. One of the wireless communication apparatuses (in the present embodiment, referred to as the first wireless communication apparatus for convenience) starts to periodically transmit the beacon frame earlier than the other wireless communication apparatus (in the present embodiment, referred to as the second wireless communication apparatus for convenience). However, the second wireless communication apparatus desires to be a wireless communication apparatus that periodically transmits the beacon frame in accordance with the requirements of the application or the like (for example, the wireless communication apparatus desires to set the beacon interval to a desired value or to manage the scheduling of the beacon interval) (this wireless communication apparatus is also referred to as a group owner).

In this situation, the second wireless communication apparatus generally transmits a request to acquire the right to transmit the beacon frame (a request to become the group owner), to the first wireless communication apparatus. Then, the first and second wireless communication apparatuses negotiate over which of the wireless communication apparatuses is to acquire the right to transmit the beacon frame (which is to become the group owner). The negotiation is conventionally carried out by exchanging management frames between the wireless communication apparatuses. Specifically, two frames initially exchanged between the wireless communication apparatuses each indicate the requirement level of the transmitting wireless communication apparatus. Then, the wireless communication apparatus with the higher requirement level acquires the right to transmit the beacon frame (becomes the group owner). Thus, the negotiation requires a total of three frames, the two frames indicating the requirement levels of the respective wireless communication apparatuses and one frame indicating the final decision (indicating whether the transmission right is handed over or not). Furthermore, in such negotiation, it is difficult to make unique determination of which of the wireless communication apparatuses is to acquire the right to transmit the beacon frame when the requirement level is the same. Moreover, each of the wireless communication apparatuses cannot recognize the requirement level of the other until starting the frame exchange for the negotiation.

Thus, if the requirement level of the wireless communication apparatus according to the present embodiment is the same as that of the communication peer, the wireless communication apparatus refers to identifiers (for example, MAC addresses) specific to the two wireless communication apparatuses. Specifically, the wireless communication apparatus compares its identifier with that of the communication peer to determine that one of the wireless communication apparatuses having the larger identifier value (or the smaller identifier value) is to acquire the right to transmit the beacon frame.

Moreover, the first wireless communication apparatus may effectively describe the requirement level thereof in the frame body field of the beacon frame. According to this technique, upon receiving the beacon frame from the first wireless communication apparatus, the second wireless communication apparatus can recognize the requirement level of the first wireless communication apparatus. Thus, the second wireless communication apparatus may compare the requirement level thereof with that of the first wireless communication apparatus. Then, the second wireless communication apparatus may transmit a frame for a request to start negotiation to the first wireless communication apparatus if the requirement level of the second wireless communication apparatus is higher than that of the first wireless communication apparatus. The second wireless communication apparatus may concede the right to transmit the beacon frame if the requirement level of the first wireless communication apparatus is higher than that of the second wireless communication apparatus.

In general, the MAC address of the transmitting wireless communication apparatus (in the present example, the first wireless communication apparatus) is described in the beacon frame as the identifier (BSSID) of the wireless communication group. Hence, like the requirement level, the MAC address of the first wireless communication apparatus can be referred to through the received beacon frame. If the requirement level of the second wireless communication apparatus is the same as that of the first wireless communication apparatus, the second wireless communication apparatus compares the MAC address thereof with that of the first wireless communication apparatus. Then, the second wireless communication apparatus may transmit a frame for a request to start negotiation to the first wireless communication apparatus if the MAC address of the second wireless communication apparatus is greater than that of the first wireless communication apparatus. The second wireless communication apparatus may concede the right to transmit the beacon frame if the MAC address of the first wireless communication apparatus is greater than that of the second wireless communication apparatus.

Thus, when the requirement level of the first wireless communication apparatus is described in the frame body field of the beacon frame, the second wireless communication apparatus can recognize the requirement level of the first wireless communication apparatus before starting negotiation. This allows frame exchanges useless for negotiation to be omitted. In other words, the second wireless communication apparatus can pre-recognize whether or not the second wireless communication apparatus can acquire the right to transmit the beacon frame. Thus, if the second wireless communication apparatus cannot acquire the right to transmit the beacon frame, the second wireless communication apparatus avoids transmitting the request frame to the first wireless communication apparatus. On the other hand, if the second wireless communication apparatus can acquire the right to transmit the beacon frame, the second wireless communication apparatus transmits the request frame to the first wireless communication apparatus. However, the first wireless communication apparatus returns a response frame indicating that the first wireless communication apparatus accepts the request, thus the negotiation is finished via a total of two frames. That is, the time required for the negotiation in the close proximity scheme is shorter than that in the normal scheme. Similar effects are exerted by describing the requirement level in the frame body field of the probe response frame instead of the beacon frame.

When the requirement levels of both wireless communication apparatuses are the same, a parameter other than the identifier specific to each wireless communication apparatus (here, which was the MAC address) may be used for comparison. For example, the wireless communication apparatus may use a timer value for comparison. Specifically, the beacon frame is used to synchronize another wireless communication apparatus, and the timer value held by the transmission source is described in the beacon frame. In IEEE 802.11, the timer value held by the transmission source is described in a Timestamp field. In general, when the wireless communication apparatus determines to join a BSS (that is, the MAC/PHY management unit 70 outputs an MLME-JOIN.request to the MAC common processing unit 15), the reception processing unit 20 receives the beacon frame from the BSS which the wireless communication apparatus is to join. The MAC common processing unit 15 matches the timer value of the wireless communication apparatus with the Timestamp value in the received beacon frame (synchronizes the timer value with the Timestamp value).

The operation involved in the comparison of the timer value will be described. It is assumed that when the MAC/PHY management unit 70 determines the BSS which the wireless communication apparatus is to join, the wireless communication apparatus may desire to acquire the right to transmit the beacon frame for the BSS (to become the group owner). Then, the requirement levels of the wireless communication apparatuses are compared with each other as described above. If the requirement level described in the received beacon frame is lower than the requirement level of the wireless communication apparatus, the MAC/PHY management unit 70 instructs the MAC common processing unit 15 to transmit the frame for a request to start negotiation. If the requirement level of the wireless communication apparatus is lower than the requirement level described in the received beacon frame, the MAC/PHY management unit 70 outputs the MLME-JOIN.request to the MAC common processing unit 15 in accordance with the normal procedure without instructing the MAC common processing unit 15 to transmit the frame for a request to start negotiation. Furthermore, if the requirement level of the wireless communication apparatus is the same as the requirement level described in the received beacon frame, the MAC/PHY management unit 70 also instructs the MAC common processing unit 15 to transmit the frame for a request to start negotiation. However, the MAC common processing unit 15 carries out comparison of the timer value before transmitting the request frame. Specifically, the MAC common processing unit 15 compares the timer value of the wireless communication apparatus with the Timestamp value in the received beacon frame. If the timer value of the wireless communication apparatus is greater than the TimeStamp value, the MAC common processing unit 15 transmits the request frame in accordance with the instruction. On the other hand, if the Timestamp value in the received beacon frame is greater than the timer value of the wireless communication apparatus, the MAC common processing unit 15 may synchronize the timer value of the wireless communication apparatus with the Timestamp value. The MAC common processing unit 15 may then notify the MAC/PHY management unit 70 of the synchronization (that is, the requirement level of the wireless communication apparatus is the same as that of the communication peer, but the timer value of the wireless communication apparatus is smaller than that of the communication peer). The timer values of the wireless communication apparatus and the communication peer are rarely the same. In this case, the MAC common processing unit 15 may randomly determine whether or not to acquire the right to transmit the beacon frame, for example, on the cast of a dice with only 1 or 0 on each side thereof. In any case, if the request frame is transmitted, the negotiation is finished via a total of two frames as in the case of the above-described example.

In the close proximity scheme, the above-described technique allows omission of frame exchange useless for the negotiation for the right to transmit the beacon frame and enables a reduction in the number of frames exchanged during the negotiation. Thus, the time required for the negotiation can be reduced.

Furthermore, as described above, for exchange of management frames, the time for which the wireless communication apparatus waits to receive a next management frame after transmitting one management frame can be effectively set to be shorter for the close proximity scheme than for the normal scheme. This control enables a reduction in the time required until the frame exchange completes. For example, as described in the third embodiment, the MAC/PHY management unit 70 can specify the time for which the wireless communication apparatus waits for an association response and notifies the MAC common processing unit 15 of the specified time through the MLME-ASSOCIATION.request primitive. Then, if the close proximity scheme is selected (dot11CloseProximityCommunicationEnabled attribute is set to TRUE), the MAC/PHY management unit 70 may specify a shorter time for the close proximity scheme than for the normal scheme. For exchange of other management frames, a similar technique can be used to exert similar effects. That is, in the close proximity scheme, the MAC/PHY management unit 70 can specify a shorter time to wait for the management frame than for the normal scheme and notify the MAC common processing unit 15 of the specified time through the MLME-ASSOCIATION.request primitive.

As described above, the wireless communication apparatus according to the present embodiment sets the time required before starting the exchange of data frames to be shorter for the close proximity scheme than for the normal scheme. Thus, the wireless communication apparatus according to the present embodiment allows a reduction in the time required to set up a communication link. This serves to provide close proximity communication suitable for use cases expected for the close proximity scheme.

Sixth Embodiment

A wireless communication apparatus according to a sixth embodiment is obtained by partly changing the wireless communication apparatuses according to the above-described first to fifth embodiments. Specifically, the wireless communication apparatus according to the present embodiment sets the transmission power and antenna gain used in accordance with the normal scheme to be similar to those used in accordance with the close proximity scheme.

In the wireless communication apparatus according to the present embodiment, the value of the above-described dot11CloseProximityCommunicationImplemented attribute is assumed to be TRUE. For example, the wireless communication apparatus sets the maximum transmission power of the normal scheme to 10 dBm as in the case of the above-described example but sets the default value to 0 dB, which is the same as the maximum transmission power of the close proximity scheme.

Moreover, the wireless communication apparatus basically avoids changing the antenna gain for the normal scheme unless the following antenna gains for the close proximity scheme are changed: the antenna gain used until a connection link is established and the antenna gain used to exchange data frames.

As described above, the wireless communication apparatus according to the sixth embodiment basically limits the difference between the operation in the normal scheme and the operation in the close proximity scheme to the carrier sense level. Thus, the wireless communication apparatus according to the present embodiment reduces a processing load involved in changing the communication scheme compared to that of the wireless communication apparatuses according to the other embodiments. Furthermore, default behavior in the normal scheme is similar to that in the close proximity scheme, leading to the similarity in reception conditions between the normal scheme and the close proximity scheme. As a result, finding a communication peer meeting the reception conditions for the close proximity scheme becomes easy. This in turn increases the number of opportunities exploited by the wireless communication apparatus to select the close proximity scheme and thus the number of opportunities exploited by the wireless communication apparatus to utilize a close proximity application.

Seventh Embodiment

A wireless communication apparatus according to the present embodiment supplements the wireless communication apparatuses according to the above-described first to sixth embodiments. Specifically, the wireless communication apparatus according to the present embodiment sets contention parameters for the close proximity scheme to more appropriate values.

IEEE 802.11 is a wireless communication scheme based on the carrier sense as described above, and more specifically adopts CSMA/CA (Carrier Sense Multiple Access with Collision Avoidance). CSMA/CA will be described below in brief. For example, with a simple mechanism in which for example, the wireless communication apparatus carries out the carrier sense to transmit a signal upon determining that the medium is idle, if a plurality of wireless communication apparatuses are waiting for the medium to be free, signals may be transmitted at the same time and contend with each other. Thus, according to CSMA/CA, each wireless communication apparatus randomly selects one of the values within a predetermined range (the values are referred to as a contention window) and waits in accordance with the selected value before transmitting a signal.

According to the normal scheme, for data frames, when data is passed from the higher layer, the priority (in IEEE 802.11, the User Priority (simply referred to as UP)) of the data is indicated. Furthermore, based on the priority of the data, priorities for access to the medium (in IEEE 802.11, the priorities are referred to as Access Categories (simply referred to as ACs)) are assigned to the data frames. Then, the data frames are transmitted in accordance with contention parameters specified for the respective priorities to access the medium. The contention parameter includes, for example, the minimum and maximum values of the contention window (in IEEE 802.11, referred to as CWmin and CWmax, respectively), the frame interval time (in IEEE 802.11, referred to as AIFSN which is expressed in units called slots) for which the wireless communication apparatus waits before starting countdown of the selected random number, and the maximum transmission right acquisition time (in IEEE 802.11, referred to as TXOP limit).

In general, the close proximity scheme involves a smaller number of wireless communication apparatuses that contend with one another than the normal scheme. It is thus assumed that realizing point-to-point communication is often sufficient for the close proximity scheme. Hence, the close proximity scheme can sufficiently avoid contentions even if the contention window for the close proximity scheme is narrower than that for the normal scheme. Rather, setting a contention window for the close proximity scheme that is equivalent in width to that for the normal scheme results in a high probability that the wireless communication apparatus has to wait for an improperly long time. Furthermore, transmission of signals is delayed depending on the wait time, increasing the time for which the medium is uselessly and inefficiently idle. Thus, the wireless communication apparatus according to the present embodiment sets the width of the contention window to be smaller for the close proximity scheme than that for the normal scheme. For example, the wireless communication apparatus sets the value of CWmax for each AC to be smaller than that for the normal scheme. Of course, the wireless communication apparatus may set other parameters appropriate for the close proximity scheme. Alternatively, while a parameter set is provided for each AC in the normal scheme, the wireless communication apparatus may exclusively use one parameter set (in IEEE 802.11, specified for AC_VO) including the smallest CWmax for the close proximity scheme.

If the values of the contention parameters are redefined for the close proximity scheme separately from those for the normal scheme, the contention parameter set for the close proximity scheme may be held in the MIB as, for example, dot11CPCATable attribute following the other previous embodiments. Similarly, if other parameters used for the normal scheme are desirably redefined for the close proximity scheme, all the redefined parameters may be held in the MIB as a close proximity parameter set (for example, dot11CloseProximityParameterTable attribute).

As described above, the wireless communication apparatus according to the seventh embodiment redefines the contention parameters for the close proximity scheme. Thus, the wireless communication apparatus according to the seventh embodiment can implement efficient CSMA/CA in the close proximity scheme.

Eighth Embodiment

A wireless communication apparatus according to an eighth embodiment supplements the wireless communication apparatuses according to the above-described first to seventh embodiments. Specifically, in the present embodiment, operations which are performed when the wireless communication apparatuses connected together in accordance with the close proximity scheme move away from each other so that the distance between the wireless communication apparatuses exceeds the communication range will be described.

In general, the normal scheme is designed under the policy that the connection is attempted to be maintained even if the status of reception of signals from the communication peer is degraded or signals from the communication peer cannot be received. On the other hand, the close proximity scheme may be required to start communication when the wireless communication apparatuses come close to each other so that the distance between the wireless communication apparatuses is within the communication range and automatically break the connection between the wireless communication apparatuses when the wireless communication apparatuses move away from each other so that the distance between the wireless communication apparatus exceeds the communication range.

Thus, when the wireless communication apparatus according to the present embodiment operating under the close proximity scheme fails to receive a frame for a given period from the communication peer with which exchange of data frames has been started, the wireless communication apparatus determines that the communication peer has moved away from the wireless communication apparatus. The wireless communication apparatus then deletes information on the status of the connection with the communication peer. The given period is specified, for example, in the MIB. For example, the MAC common processing unit 15 monitors the status of reception of frames from the communication peer while referring to the given period. The MAC common processing unit 15 holds a management table configured to manage information on other wireless communication apparatuses whose associations are permitted. Upon determining that the wireless communication apparatus corresponding to the communication peer has moved away, the MAC common processing unit 15 deletes the information on the status of connection with the wireless communication apparatus from the management table. Additionally, if the transmission period for the wireless communication apparatus is scheduled during the beacon interval, the MAC common processing unit 15 also cancels the scheduled transmission period.

When the wireless communication apparatus according to the eighth embodiment operating under the close proximity scheme fails to receive a frame for the given period from the communication peer with which exchange of data frames has been started, the wireless communication apparatus determines that the communication peer has moved away from the wireless communication apparatus. The wireless communication apparatus then deletes information on the status of the connection with the communication peer. Thus, the wireless communication apparatus according to the present embodiment operating under the close proximity scheme can automatically break the connection between the two wireless communication apparatuses when the wireless communication apparatus corresponding to the communication peer gets away from the wireless communication apparatus according to the present embodiment so that the distance between the two wireless communication apparatuses exceeds the communication range.

The wireless communication apparatus according to the present embodiment uses a higher carrier sense level for the close proximity scheme than that for the normal scheme as is the case with the above-described first embodiment, to limit receivable MAC frames to those transmitted within the communication range for the close proximity scheme. Thus, if the wireless communication apparatus corresponding to the communication peer has moved away so that the distance between the two wireless communication apparatuses exceeds the communication range, the MAC frames transmitted by the wireless communication apparatus corresponding to the communication peer fail to be passed to the MAC processing unit 10. As a result, no frame is received for a certain period.

Ninth Embodiment

A ninth embodiment comprises a buffer in addition to the components of the wireless communication apparatus in FIG. 1, FIG. 3, or FIG. 4. The inclusion of the buffer in the wireless communication apparatus enables transmitted and received frames to be held in the buffer. As a result, a retransmission process or an external output process can be easily carried out.

Tenth Embodiment

A tenth embodiment comprises a bus, a processor unit, and an external interface unit, in addition to the components of the wireless communication apparatus according to the ninth embodiment. The processor unit and the external interface unit are connected to the buffer via a bus. Firmware operates in the processor unit. Thus, the firmware included in the wireless communication apparatus enables the functions of the wireless communication apparatus to be easily changed by rewriting the firmware.

Eleventh Embodiment

An eleventh embodiment comprises a clock generation unit in addition to the components of the wireless communication apparatus in FIG. 1, FIG. 3, or FIG. 4. The clock generation unit generates and outputs a clock to the outside of the wireless communication apparatus through an output terminal. Thus, the clock generated inside the wireless communication apparatus is output to the outside so that the output clock is used to operate a host side. This enables the host side and the wireless communication apparatus to operate synchronously.

Twelfth Embodiment

A twelfth embodiment includes a power supply unit, a power supply control unit, and a wireless power feeding unit in addition to the components of the wireless communication apparatus in FIG. 1, FIG. 3, or FIG. 4. The power supply control unit is connected to the power supply unit and the wireless power feeding unit to control selection of a power supply to be provided to the wireless communication apparatus. Thus, the power supply provided in the wireless communication apparatus can be controlled so as to enable operations with reduced power consumption.

Thirteenth Embodiment

A thirteenth embodiment includes a SIM card in addition to the components of the wireless communication apparatus according to the twelfth embodiment. The SIM card is connected to the MAC processing unit 10 or the MAC/PHY management unit 70. Thus, the SIM card provided in the wireless communication apparatus enables an authentication process to be easily carried out.

Fourteenth Embodiment

A fourteenth embodiment includes a motion picture compression/decompression unit in addition to the components of the wireless communication apparatus according to the tenth embodiment. The motion picture compression/decompression unit is connected to the bus. Thus, the motion picture compression/decompression unit provided in the wireless communication apparatus enables transmission of compressed motion pictures and decompression of received compressed motion pictures to be easily achieved.

Fifteenth Embodiment

A fifteenth embodiment includes an LED unit in addition to the components of the wireless communication apparatus in FIG. 1, FIG. 3, or FIG. 4. The LED unit is connected to the MAC processing unit 10 or the PHY processing unit 40. Thus, the LED unit provided in the wireless communication apparatus enables the user to be easily notified of the operational status of the wireless communication apparatus.

Sixteenth Embodiment

A sixteenth embodiment includes a vibrator unit in addition to the components of the wireless communication apparatus in FIG. 1, FIG. 3, or FIG. 4. The vibrator unit is connected to the MAC processing unit 10 or the PHY processing unit 40. Thus, the vibrator unit provided in the wireless communication apparatus enables the user to be easily notified of the operational status of the wireless communication apparatus.

Seventeenth Embodiment

A seventeenth embodiment comprises, in addition to the components of the wireless communication apparatus in FIG. 1, FIG. 3, or FIG. 4, the plurality of different PHY processing units 40 as described in the first embodiment, and further includes a wireless switching unit. The wireless switching unit is connected to the plurality of different PHY processing units 40 to switch communications based on the different PHY processing units 40. Thus, the plurality of PHY processing units 40 provided in the wireless communication apparatus enable switching to the communication using the appropriate PHY processing unit 40 depending on the situation.

Eighteenth Embodiment

An eighteenth embodiment comprises, in addition to the components of the wireless communication apparatus in FIG. 1, FIG. 3, or FIG. 4, the plurality of different PHY processing units 40 as described in the first embodiment, and pairs each of the reception processing unit 20 and the transmission processing unit 30 which pairs correspond to the respective PHY processing units 40. The eighteenth embodiment further includes a wireless switching unit. The wireless switching unit is connected so as to allow switching among the pairs of the reception processing unit 20 and the transmission processing unit 30. The wireless switching unit switches among a plurality of communication schemes based on the different reception processing units 20, transmission processing units 30, and PHY processing units 40. Thus, the plurality of different sets of each of the reception processing unit 20, transmission processing unit 30, and PHY processing unit 40 provided in the wireless communication apparatus enable switching to the communication using the appropriate set of the reception processing unit 20, transmission processing unit 30, and PHY processing unit 40.

Nineteenth Embodiment

A nineteenth embodiment includes a switch (SW) in addition to the components of the wireless communication apparatus according to the seventeenth embodiment. The switch is connected to the antenna 60, the plurality of different PHY processing units 40, and the wireless switching unit. Thus, the switch provided in the wireless communication apparatus enables switching to communication using the appropriate PHY processing unit 40 depending on the situation, with the antenna shared by the PHY processing units 40.

Twentieth Embodiment

A twentieth embodiment includes a switch (SW) in addition to the components of the wireless communication apparatus according to the eighteenth embodiment. The switch is connected to the antenna 60, the root of the pair of the reception processing unit 20 and the transmission processing unit 30, and the wireless switching unit. Thus, the switch provided in the wireless communication apparatus enables switching to communication using the appropriate set of the reception processing unit 20, transmission processing unit 30, and PHY processing unit 40 depending on the situation, with the antenna shared by the sets.

The processing in each of the above-described embodiments can be implemented using a general-purpose computer as basic hardware. A program implementing the processing in each of the above-described embodiments may be stored in a computer-readable storage medium for provision. The program is stored in the storage medium as a file in an installable or executable format. The storage medium may be a magnetic disk, an optical disc (CD-ROM, CD-R, DVD, or the like), a magnetooptic disc (MO or the like), a semiconductor memory, or the like. That is, the storage medium may be in any format provided that the program can be stored in the storage medium and read by the computer. Furthermore, the program implementing the processing in each of the above-described embodiments may be stored in a computer (server) connected to a network such as the Internet and downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus supporting a first scheme and a second scheme, the apparatus comprising:
processing circuitry configured to set first information and second information,
wherein:
the first scheme uses a first set of physical schemes and the second scheme uses a second set of the physical schemes,
the processing circuitry sets a second level greater than a first level for the second information and sets a second power value smaller than a first power value for the first information, if the second scheme is used,
the first level corresponds to a lowest level among minimum receiving sensitivity levels specified for the second set of the physical schemes, and
a communication range of the second scheme is narrower than a communication range of the first scheme.

2. The apparatus according to claim 1, wherein the processing circuitry determines whether the second scheme is used, based on information included in at least one of a beacon frame and a probe response frame.

3. The apparatus according to claim 1, further comprising a frequency conversion circuit configured to carry out up-conversion and down-conversion.

4. The apparatus according to claim 1, further comprising an antenna configured to transmit and receive a wireless signal.

5. The apparatus according to claim 1, wherein the second set of the physical schemes corresponds to a modulation and coding scheme.

6. The apparatus according to claim 1, wherein the apparatus performs wireless communication conforming to an IEEE 802.11 standard.

7. The apparatus according to claim 1, further comprising:
an antenna;
a transmitter configured to transmit a first frame; and
a receiver configured to receive a second frame,
wherein the receiver uses the second level, and the transmitter uses the second power value.

8. The apparatus according to claim 1, wherein minimum receiving sensitivity levels of the first set of physical schemes and the second set of the physical schemes are equal to the first level.

9. The apparatus according to claim 1, further comprising a management information base which holds an attribute indicating whether or not the apparatus operates in accordance with the second scheme.

10. The apparatus according to claim 1, wherein the processing circuitry sets the first power value as a maximum transmission power and sets the first level as a carrier sense level, if the second scheme fails to be used.

11. The apparatus according to claim 1, wherein the processing circuitry sets the second power value smaller than the first power value as a maximum transmission power and sets the second level greater than the first level as a carrier sense level, if the second scheme is used.

12. The apparatus according to claim 1, further comprising a second processing unit configured to carry out carrier sense using the first level or the second level as a carrier sense level.

13. The apparatus according to claim 12, further comprising a third processing unit configured to control transmission and reception of a frame via the second processing unit.

14. The apparatus according to claim 13, wherein the third processing unit, upon receiving an instruction to start formation of a wireless communication group from the processing circuitry, and if the second scheme is used, generates at least one of a beacon frame and a probe response frame both including a frame body which carries information indicating that an attribute of the wireless communication group is the second scheme.

15. The apparatus according to claim 13, wherein the second processing unit decodes a reception signal and passes information on the reception signal to the third processing unit when a reception level is equal to or greater than the carrier sense level, and avoids decoding the reception signal when the reception level is less than the carrier sense level.

16. The apparatus according to claim 13, wherein the third processing unit passes information on a transmission signal to the second processing unit when the reception level is less than the carrier sense level.

17. The apparatus according to claim 13, wherein the third processing unit excludes a period for another wireless communication apparatus using the first scheme to transmit a data frame, from a schedule within a beacon interval if the second scheme is used.

18. The apparatus according to claim 1, wherein the processing circuitry sets a contention parameter specifying a contention window narrower than a contention window for the first scheme if the second scheme is used.

19. The apparatus according to claim 1, wherein the processing circuitry ignores a network identifier included in reception signal information if the second scheme is used.

20. The apparatus according to claim 1, wherein the processing circuitry, upon determining to join to a wireless communication group having an attribute for the second scheme, rewrites a value of the attribute indicating whether or not the second scheme is used, sets the second power value as a maximum transmission power, and sets the second level as a carrier sense level.

\* \* \* \* \*